US 8,994,731 B2

(12) United States Patent
Nevins

(10) Patent No.: US 8,994,731 B2
(45) Date of Patent: Mar. 31, 2015

(54) APPARATUS, SYSTEM, AND METHOD FOR ORGANIZING INFORMATION BY TIME AND PLACE

(75) Inventor: David C. Nevins, Wilmington, DE (US)

(73) Assignee: Temporal LLC, New York, NY (US)

( * ) Notice: Subject to any disclaimer, the term of this patent is extended or adjusted under 35 U.S.C. 154(b) by 1019 days.

(21) Appl. No.: 12/340,453

(22) Filed: Dec. 19, 2008

(65) Prior Publication Data
US 2009/0164439 A1 Jun. 25, 2009

Related U.S. Application Data

(60) Provisional application No. 61/015,120, filed on Dec. 19, 2007.

(51) Int. Cl.
*G06T 11/20* (2006.01)
*G06F 17/30* (2006.01)

(52) U.S. Cl.
CPC .... *G06F 17/30551* (2013.01); *G06F 17/30241* (2013.01)
USPC ......................................................... 345/440

(58) Field of Classification Search
None
See application file for complete search history.

(56) References Cited

U.S. PATENT DOCUMENTS

| | | | |
|---|---|---|---|
| 5,553,209 A * | 9/1996 | Johnson et al. ................ | 345/667 |
| 6,502,107 B1 | 12/2002 | Nishida | |
| 6,591,011 B1 | 7/2003 | Nielsen | |
| 6,721,749 B1 | 4/2004 | Najm et al. | |
| 6,741,864 B2 | 5/2004 | Wilcock et al. | |
| 6,904,160 B2 | 6/2005 | Burgess | |
| 6,906,709 B1 | 6/2005 | Larkin et al. | |
| 6,914,626 B2 | 7/2005 | Squibbs | |
| 6,917,878 B2 * | 7/2005 | Pechatnikov et al. .......... | 701/210 |
| 6,920,328 B2 * | 7/2005 | Wollrab ..................... | 455/456.1 |
| 6,928,230 B2 | 8/2005 | Squibbs | |

(Continued)

FOREIGN PATENT DOCUMENTS

WO  0115017 A1  3/2001

OTHER PUBLICATIONS

Rozsnyai et al., Event Cloud—Searching for Correlated Business Events, Jul. 2007, E-Commerce Technology and the 4th IEEE International Conference on Enterprise Computing, E-Commerce, and E-Services, pp. 409-416.*

(Continued)

*Primary Examiner* — Aaron M Richer
*Assistant Examiner* — Anh-Tuan V Nguyen
(74) *Attorney, Agent, or Firm* — Knobbe, Martens, Olson & Bear LLP

(57) ABSTRACT

An apparatus and method for capturing and organizing information spatio-temporally utilizes a standardized time reference and geographical locations to associate a time and a place to each event that is captured. These events are placed in a coordinate system according to the associated times and places. The apparatus and method may use a meridial clock. A series of related events forms an event path that progresses chronologically. Plural event paths are illustrated in a coordinate system based image of a user interface. Events from different event paths are synchronized so that events that occur in a particular moment are placed in the same time plane. As time progresses, the events emit from the plane into a region representing the past, and a relationship of events with their times and places is illustrated. A map in the plane of the image may facilitate visualization of places and times with events.

7 Claims, 23 Drawing Sheets

(56) References Cited

U.S. PATENT DOCUMENTS

| | | |
|---|---|---|
| 6,950,535 B2 | 9/2005 | Sibayama et al. |
| 6,995,778 B2 * | 2/2006 | Noble et al. ............... 345/632 |
| 7,107,285 B2 | 9/2006 | von Kaenel et al. |
| 7,256,711 B2 * | 8/2007 | Sheha et al. ............. 340/995.1 |
| 7,409,429 B2 * | 8/2008 | Kaufman et al. ............ 709/207 |
| 7,999,810 B1 * | 8/2011 | Boice et al. ................. 345/473 |
| 8,035,635 B2 * | 10/2011 | Shefi ............................ 345/419 |
| 2001/0015756 A1 | 8/2001 | Wilcock et al. |
| 2001/0015759 A1 | 8/2001 | Squibbs |
| 2001/0016849 A1 | 8/2001 | Squibbs |
| 2002/0044690 A1 | 4/2002 | Burgess |
| 2003/0074373 A1 | 4/2003 | Kaburagi et al. |
| 2003/0112358 A1 * | 6/2003 | Hamada ................... 348/333.12 |
| 2004/0076345 A1 | 4/2004 | Olszak et al. |
| 2004/0117358 A1 | 6/2004 | von Kaenel et al. |
| 2004/0174434 A1 | 9/2004 | Walker et al. |
| 2005/0012743 A1 | 1/2005 | Kapler et al. |
| 2005/0135313 A1 * | 6/2005 | Gandhi et al. ................ 370/335 |
| 2005/0190273 A1 | 9/2005 | Toyama et al. |
| 2006/0075442 A1 | 4/2006 | Meadow |
| 2006/0190285 A1 * | 8/2006 | Harris et al. ..................... 705/1 |
| 2006/0277188 A1 | 12/2006 | Irish et al. |
| 2007/0050340 A1 | 3/2007 | von Kaenel et al. |
| 2007/0161380 A1 | 7/2007 | Fok et al. |
| 2008/0168242 A1 * | 7/2008 | Eberbach et al. ............. 711/161 |
| 2008/0255625 A1 * | 10/2008 | Powers .............................. 607/5 |
| 2009/0006143 A1 | 1/2009 | Orttung et al. ..................... 705/5 |
| 2009/0262131 A1 * | 10/2009 | Suntinger et al. ............. 345/619 |
| 2010/0220978 A1 * | 9/2010 | Ogikubo ........................... 386/95 |

OTHER PUBLICATIONS

PCT/US2008/087825 International Search Report and Written Opinion, Jul. 31, 2009.

* cited by examiner

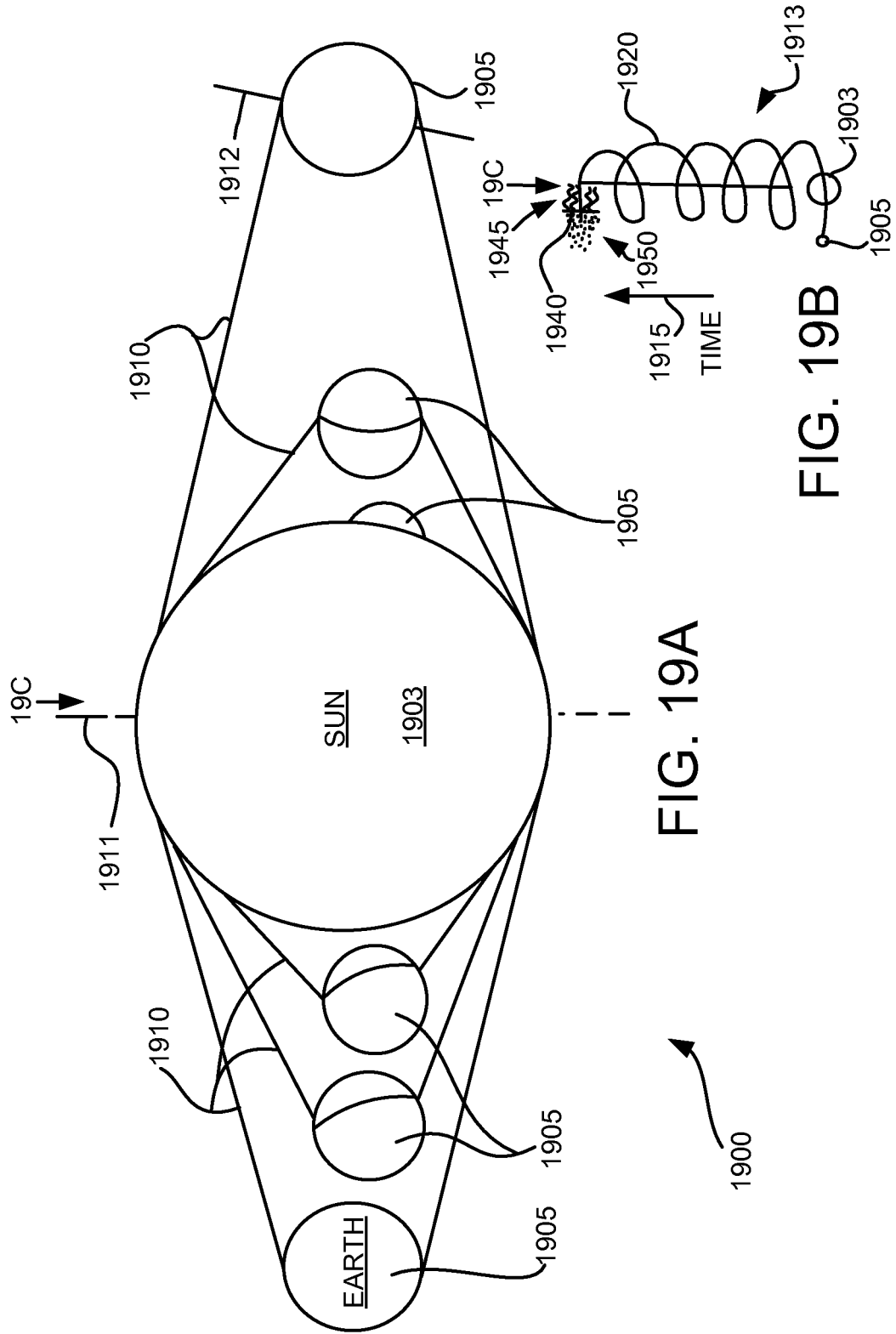

APPARATUS, SYSTEM, AND METHOD FOR ORGANIZING INFORMATION BY TIME AND PLACE

CROSS-REFERENCES TO RELATED APPLICATIONS

This application claims priority to U.S. Provisional Patent Application No. 61/015,120 entitled "APPARATUS, SYSTEM, AND METHOD FOR ORGANIZING INFORMATION BY TIME AND PLACE" and filed on Dec. 19, 2007 for David C. Nevins, which is incorporated herein by reference.

BACKGROUND

1. Field of the Invention

This invention relates generally to data storage systems and methods and more particularly relates to a way of storing and accessing data of multiple types by a common system facilitated by user interfaces.

2. Description of the Related Art

Conventional data organization and storage systems and apparatuses and their related methods utilize a wide variety of platforms and applications for organizing and storing data. These platforms and applications are not easily interfaced. There is a lack of interoperability that often requires costly re-entry of data when moving data from one application into different applications. This often occurs when data used by one organization using a first application is provided to another organization that uses a second application that is incompatible with the first application.

Conventional user interfaces for data capture and organization applications vary from one application to another. These user interfaces often require training or an extensive period of learning how to use the applications. Furthermore, if a user needs information that is only accessible through other applications or from data in incompatible databases, then re-entry of data is often required.

SUMMARY

From the foregoing discussion, it should be apparent that a need exists for an apparatus, system, and method that aids in capture and organization of information. Beneficially, such an apparatus, system, and method would enable universal access to data, and would overcome the interoperability problems of the past. Many types of data may be organized by time and place where the time is standardized. User interfaces would allow large volumes of data to be represented in intuitive visual displays between which users can easily navigate.

The present invention has been developed in response to the present state of the art, and in particular, in response to the problems and needs in the art that have not yet been fully solved by currently available platforms and applications. Accordingly, the present invention has been developed to provide an apparatus, system, and method for capturing and organizing data by time and place that overcome many or all of the above-discussed shortcomings in the art.

In a simple form, an apparatus in accordance with embodiments of the invention includes a computer readable storage medium encoded with instructions capable of being executed by a computer for recording information by time and place. The apparatus includes a capture module that is configured to capture information including at least a time and a place of an event. The apparatus also includes a plot module that is configured to place the information in a coordinate system in which the coordinate system has at least a first variable representing times and at least a second variable representing places. The information is placed in the coordinate system in a manner that correlates the time and the place.

In one embodiment of the apparatus, the capture module captures information from a plurality of times and places for a plurality of events. In this embodiment, the plot module places the information from the plurality of times and places for the plurality of events in the coordinate system.

In another embodiment, the apparatus includes a user interface module. The user interface module is configured to provide a universal information source of events organized by time and place. In this embodiment, the user interface module may be configured to enable a user to access information on a particular event by zooming in on at least one of a place and a time among the plurality of times and places in the coordinate system.

In one embodiment, the apparatus includes a correlation module that is configured to correlate a particular element of time information with a particular element of location information for a particular event. The correlation module is also configured to associate a series of events with each other to form an event path in which each of the series of events has at least one of an individual, animal, vegetation, object, and process in common with another of the series of events. In this embodiment, the correlation module may form a plurality of distinct event paths. In this embodiment, the apparatus may further include a user interface module configured to present the plurality of event paths on the coordinate system such that the event paths are correlated by time and location.

In another embodiment, the apparatus further includes a third variable. In this case, the second variable is a variable value on an x-axis representing a location in a first dimension of two-dimensional space. The third variable is a variable value on a y-axis representing a location in a second dimension of the two-dimensional space. In still another embodiment, the coordinate system is a three dimensional coordinate system. In this case, the first variable is a variable value on a z-axis representing at least one of a time and a location in a third dimension of the three dimensional space. In this case the apparatus may further include a fourth variable that is an alternative variable value on the z-axis. Thus, the first variable may represent time and the fourth variable may represent a location in the third dimension of a Cartesian coordinate system.

In another embodiment, the apparatus includes a correlation module that is configured to correlate a particular element of time information with a particular element of location information for a particular event.

In another simple form, an apparatus in accordance with embodiments of the invention organizes information by place and time and includes a capture module that captures event information, location information, and time information. In these embodiments, the apparatus also includes a correlation module that correlates a particular unit of the event information, a particular unit of the location information, and a particular unit of the time information as a particular event in a plurality of events. Also, in these embodiments, the apparatus includes a plot module that plots the particular event of the plurality of events on at least one member of a group consisting of an x-axis and a y-axis of a Cartesian coordinate system from the unit of location information correlated with the particular event and on a z-axis of the Cartesian coordinate system from the unit of time information correlated with the particular event.

In one embodiment, the particular unit of event information that is correlated with the particular event includes information that identifies the particular event with one member of a first group including a single user, a group of users, an individual who is not a user, a group with at least one individual who is not a user, an object, a group of objects, an animal, a group of animals, a unit of vegetation, a group of units of vegetation, a phenomenon, a group of phenomena, a record stored in at least one electronic storage device, a group of records stored in at least one electronic storage device, a process executing on at least one computer, a group of processes executing on at least one computer, a related series of events, and a location. In this embodiment, each event of the plurality of events belongs to the same member of the first group and wherein the plot module plots the plurality of events as one member of a second group including an event path and a location pipeline.

In another embodiment, at least one of the particular unit of event information, the particular unit of location information, and the particular unit of time information includes a capture of information from a group including a record stored in at least one electronic storage device, an image from a scanner, input from a user interface, a process executing on at least one computer, a position device, and media data. In this embodiment, the position device is selected from one member of a group including a Global Positioning System, an Inertial Measurement Unit, a device reading a Radio Frequency Identification, and a sensor. The media data is selected from one format of a group of formats including audio, at least one picture, video, and graphics. In this embodiment, the apparatus may further include a search module that allows a user to search a database storing event information, location information, and time information correlated as events by at least one category of a group of categories including individual user, group of users, place, time, and event. This embodiment may also include an event-player module that sequentially plays individual captures of information from a group of at least one selected series of events as those events are plotted along the z-axis. In this embodiment, the event-player module may also play compatible individual captures of information concurrently in real time. Compatible individual captures of information may include at least one image and audio. The at least one image and the audio may from related regions of the z-axis. Still further, this embodiment may include a temporal zoom module that allows a user to select a region of the z-axis for display and for play by the event-player module.

In another embodiment, the apparatus includes a peer-to-peer module that allows a particular individual user to register over a network to store a series of events associated with the particular user in the database and to access the series of events pertaining to the particular individual user. The registered user may also store a plurality of events not submitted to the database by the particular user.

In another embodiment, the apparatus includes a location zoom module that allows a user to select the size of the region of at least one of the x-axis and the y-axis for display.

In still another embodiment, the apparatus includes an event-horizon module. The event-horizon module plots the location of at least one event on the x-axis, the y-axis, and the z-axis of a Cartesian coordinate system.

In another simple form, embodiments of the invention include a method of correlating information based on time and location. The method includes placing event information in a coordinate system having variables representing time and location. In these embodiments, placing the event information in a coordinate system having variables representing time and location may include facilitating access to the information universally. Also in these embodiments of the method, placing the event information in a coordinate system having variables representing time and location may include representing time in a standardized time reference.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any manner in one or more embodiments. The invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 19A is a diagrammatic side plan view of a sun and earth coordinate system showing meridial planes when the earth is at a variety of positions in its orbit around the sun;

FIG. 19B is a diagrammatic perspective view of the sun and earth coordinate system of FIG. 19A illustrating a spatially depicted time dimension;

DETAILED DESCRIPTION OF THE INVENTION

Figure 1:
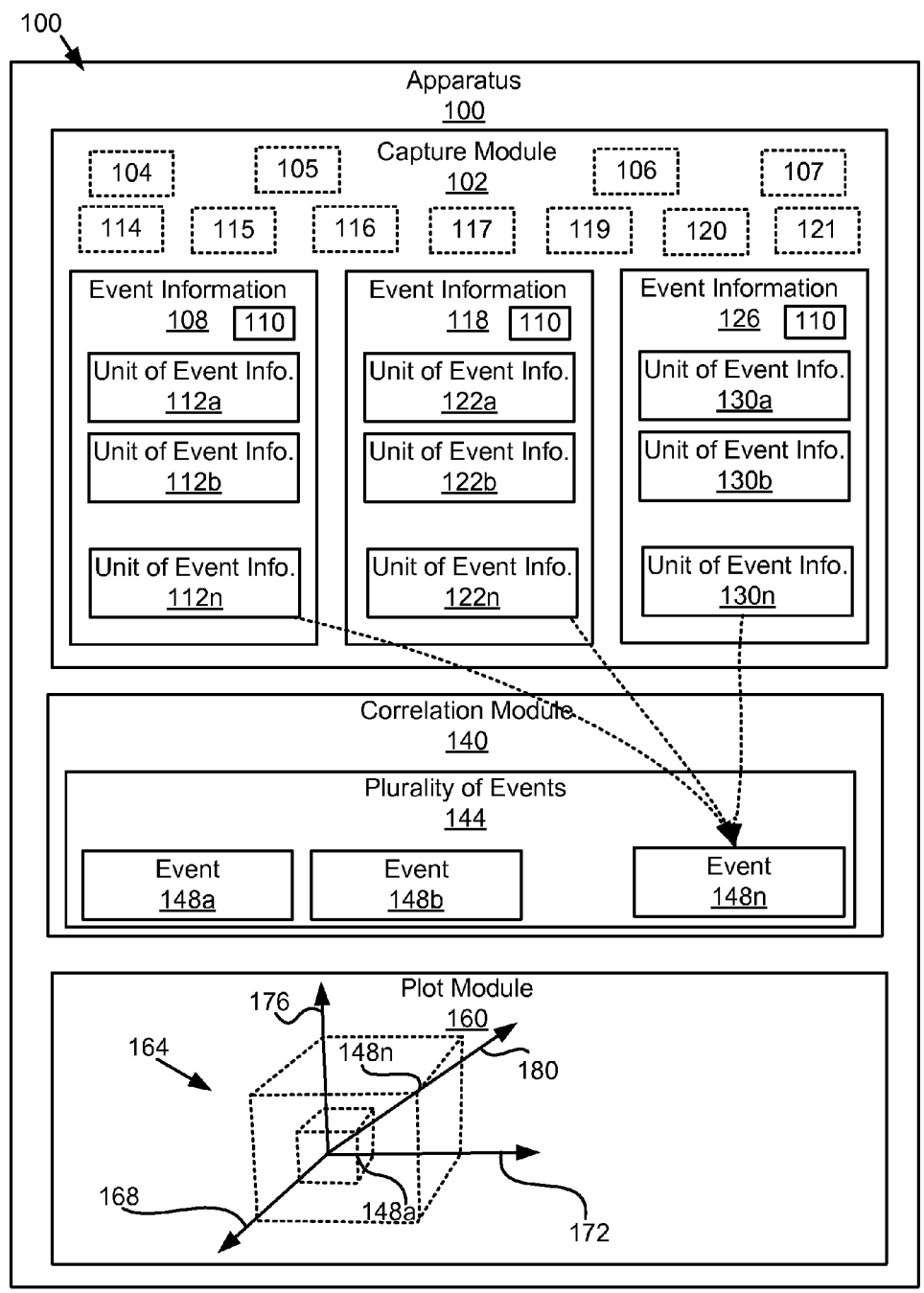
FIG. 1 is a schematic block diagram illustrating one embodiment of an apparatus for organizing information by time and place in accordance with the present invention.

Many of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. The invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of an apparatus 100 for organizing information by time and place in accordance with the present invention. The apparatus 100 includes a capture module 102, a correlation module 140, and a plot module 160. The various components of the apparatus 100 cooperate to organize information by time and place.

The capture module 102 captures event information 108, location information 118, and time information 126. The event information 108 includes individual units of event information 112a-112n. Similarly, the location information 118 includes individual units of location information 122a-122n. Likewise, the time information 126 comprises individual units of time information 130a-130n.

The correlation module 140 correlates a particular unit of event information 112n, a particular unit of location information 122n, and a particular unit of time information 130n into a particular event 148n in a plurality of events 144. The resulting event 148n may describe taking a picture, a concert, a financial transaction, a signal from a sensor, an act of historical significance, a meeting, or any other occurrence or happening that can be defined and differentiated.

The individual units of event information 112a-112n may contain information that differentiates and defines each individual event 148n in the plurality of events 144. For example, a particular unit of event information 112n may include information that defines an event 148n by category (not shown), such as a debit from a bank account, a concert, a picture taking, a sensor reading, etc. Somewhere in the unit of event information 112n, the unit of location information 122n, and/or the unit of time information 130n pertaining to a particular event 148n exists information capable of differentiating the particular event 148n. Certain embodiments differentiate events 148a-148n by location information 118 or by time information 126. Other embodiments differentiate events 148a-148n by including information in the particular unit of event information 112n that differentiates a particular event 148n by naming the particular event 148n.

For example, the particular unit of event information 112n may include information identifying a particular individual (not shown) using the apparatus 100 who takes a picture comprising the event 148n, attends the concert comprising the event 148n, makes the financial transaction comprising the event 148n, or otherwise is associated with the event 148n. Similarly, the particular unit of event information 112n may include information identifying a group of individuals using the apparatus 100, at least one of which is associated with the event 148n. Likewise, the particular unit of event information 112n may include information identifying a particular individual who does not use the apparatus 100, or a group of individuals with at least one individual that does not use the apparatus 100, where the particular individual or group of individuals is associated with the event 148n.

Many data capture devices include one or more of time, date, and location data that enables embodiments of the invention to utilize the events locations and times. Alternatively, the system may aggregate a time and date automatically when the data is uploaded. For example, photographs that are to be uploaded are time and date stamped either by the camera itself or by the system. Some cameras also include a latitude and longitude stamps. The user may also be prompted to enter a location. In another example, a GPS device has time, latitude, and longitude associated with captured data. Also, financial and other transactions have time and place stamps that are accessed in accordance with embodiments of the present invention. An apparatus or system isolates time and date coding, adds user or object coding, and reorganizes it onto placeholders of a grid or coordinate system. This may be accomplished as a process under software or other logic control.

The particular unit of event information 112n may include information identifying an object or group of objects associated with the event 148n. In some embodiments, the object triggers a signal from a sensor, where the triggering of the signal describes the event 148n, such as when a product passes a certain point on an assembly line. In certain embodiments, the particular unit of event information 112n may include information identifying an animal or group of animals, a unit of vegetation, a group of units of vegetation, a phenomenon, or a group of phenomena associated with the event 148n.

In certain embodiments, the particular unit of event information 112n may include information identifying an account, a record, or a group of records stored in a database connected to a computer or a process, a group of processes, and application, or a group of applications executing on a computer associated with the event 148n. In some embodiments, the particular unit of event information 112n may include information used to identify and group together a series of related events 148a-148n. The particular unit of event information 112n may also include information identifying the name of a location associated with the event 148n.

A particular unit of location information 118n may include a latitude and a longitude, pinpointing location with respect to the globe; a latitude, a longitude, and an elevation, also pinpointing location with respect to the globe; or a set of vectors defined with reference to a predefined origin, where the set of vectors are defined on a Cartesian coordinate system and may be defined in terms of a single axis, two axes, or all three axes of the Cartesian coordinate system. A particular unit of location information 122n may include information about pre-defined locations such as streets, buildings, and/or a particular point in an assembly line used to locate an event. Alternative or additional types of location information useful in locating an event 148n may be implemented without limitation. A particular unit of time information 126n may include a time stamp, a start time and an end time, a time range, and/or a date. Alternative or additional types of temporal information useful in temporally defining an event 148n may be implemented without limitation.

It is to be understood that by utilizing the various views or user interfaces described herein, a user can view relationships between units of event, units of location, and units of time. These views correlate the units by time, place, or event to provide a user the options of viewing from a variety of virtual vantage points. For example, a user can select a particular location and view the changes that have occurred to that location over a period of time. In this case, the user could use a slider to move up and down the event path. In another example, the user can select a particular time or range of times and examine a given point on a map at that time. In another example, a user may isolate all of the transactions for a product in a city, state, nation, or globally for a particular matter and a particular date. This may be accomplished by sliding the meridial plane or a slider up or down, or by expanding the slider to include a range of dates.

The capture module 102 used to capture event information 108, location information 118, and time information 126 may include a clock 110 to provide information about time. The capture module 102 may include a Global Positioning System 104 transmitting time information 118 and location information 126, in terms of latitude and longitude. The capture module 102 may include an Inertial Measurement Unit 105 to provide information about position. The capture module 102 may include a device 106 capable of reading a Radio Frequency Identification (not shown) to provide information about time and/or position. The capture module 102 may include a motion sensor or other type of sensor 107 that provides a signal used to determine information about time and/or position.

The capture module 102 may include an audio recorder 114, a video recorder 115, or an image recorder 116. The capture module 102 may include a scanner 117, at least one computer 119 with a user interface 120 capable of receiving event information 108, location information 118, and time information 126. The capture module 102 may also include software capable of capturing status information about a computer application, a financial account, or any process occurring on and/or recorded in a computer. The capture module 102 may include a network 121, which may include a router, a switch, a wireless hub, and the like, capable of connecting multiple computers and or devices employed by the capture module 102.

The plot module 160 plots a plurality of events 144 on a Cartesian coordinate system 164. In certain embodiments, the Cartesian coordinate system 164 comprises an x-axis 168, a y-axis 172, and a z-axis 176. In other embodiments, the Cartesian coordinate system 164 only comprises one of the x-axis 168 and the y-axis 172, together with the z-axis 176.

The x-axis 168 and the y-axis 172 of the Cartesian coordinate system 164 are used to plot location information 118 in two dimensions. In embodiments with only the x-axis 168 or only the y-axis 172, the single axis 168/172 is used to plot location information 118, whether the location information is plotted with relation to increments that may be uniformly spaced or not. In many embodiments, the z-axis 176 is devoted to a timeline for plotting time information 126, whether the increments of the time line are uniformly spaced or not. In certain embodiments discussed below, the z-axis 176 is also devoted to plotting location information 118.

In certain embodiments, the plot module 160 uses the identifying information contained in a units of event information 112a-112n, as discussed above, to plot an event path 180 comprising a series of events 148a-148n that share common identifying information. That may include information identifying the series of events 148a-148n with a single user, a group of users, an individual who is not a user, a group with at least one individual who is not a user, an object, a group of objects, an animal, a group of animals, a unit of vegetation, a group of units of vegetation, a phenomenon, a group of phenomena, a record or group of records stored in at least one electronic storage device, a process or group of processes executing on at least one computer, a related series of events, or a location.

Figure 2:
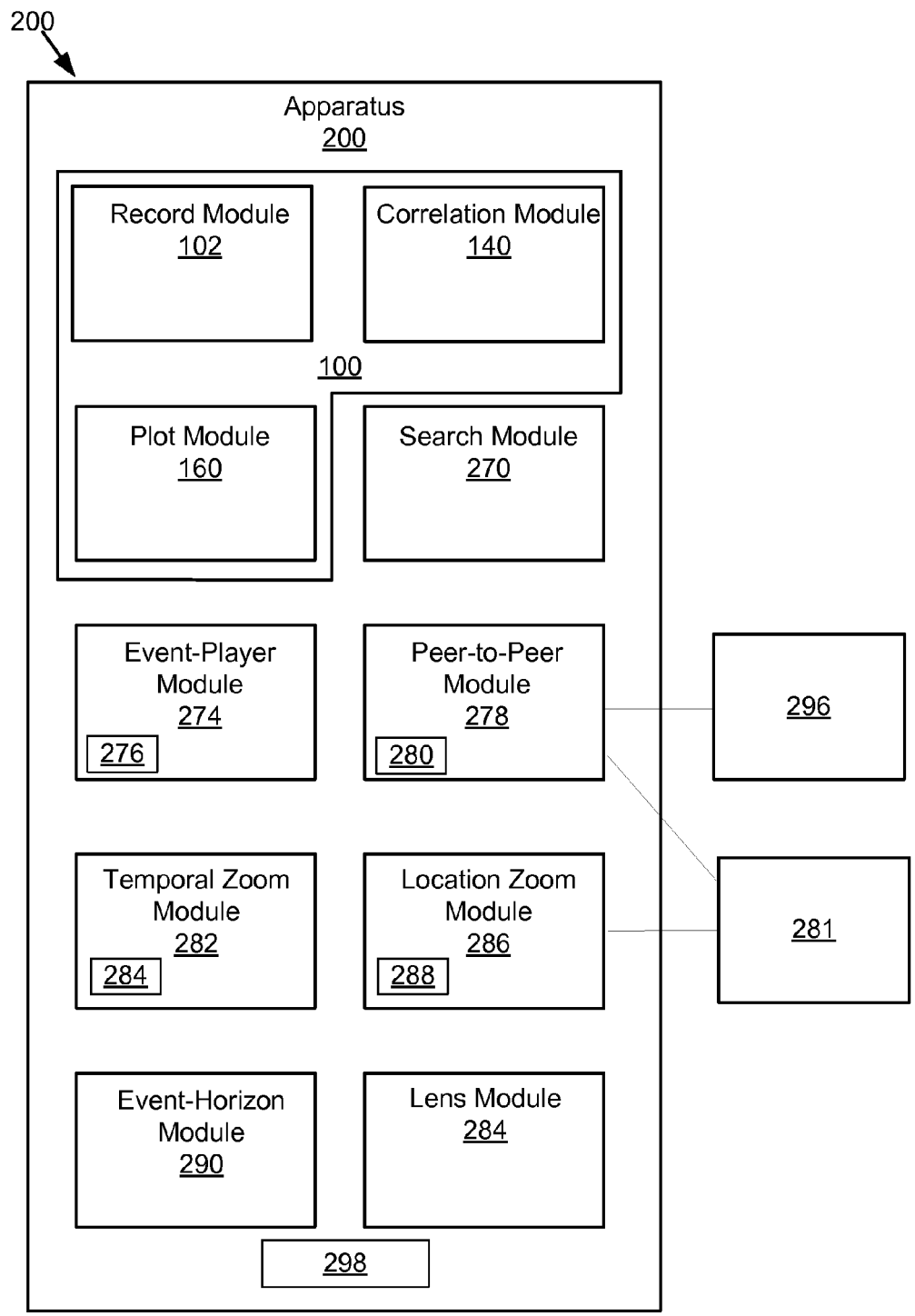
FIG. 2 is a schematic block diagram illustrating another embodiment of an apparatus for organizing information by time and place in accordance with the present invention.

FIG. 2 is a schematic block diagram illustrating another embodiment of an apparatus 200 for organizing information by time and place in accordance with the present invention. The apparatus 200 includes a capture module 102, a correlation module 140, and a plot module 160 substantially similar to the capture module 102, the correlation module 140, and the plot module 160 discussed above with respect to FIG. 1. The apparatus 200 also includes a search module 270, an event-player module 274, a peer-to-peer module 278, a temporal zoom module 282, a location zoom module 286, a lens module 290, and an event-horizon module 294. The various components of the apparatus 200 cooperate to organize information by time and place.

The search module 270 allows a user to search a database 296 storing event information 108, location information 118, and time information 126 correlated as a plurality of events 144 by the correlation module 140 for individual events 148a-148n. The search module 270 includes a user interface 298 that allows a user to make queries of the plurality of events 144 by location, time, and by key words, such as by the name of an individual user that may be associated with particular events 148a-148n.

The event-player module 274 includes a user interface 276 that allows a user to select events, possibly with the aid of the search module 270. The event-player module 274 then allows the user to play media formats embedded in the units of event information 112a-112n of the selected events 148a-148n. In one embodiment, the event player module 274 plays the media associated with each selected event 148n in a chronological order based on the unit of time information 130n pertaining to each event 148n. In certain embodiments, the event-player module 274 will display media in the form of an image at the same time as media in the form of audio where the two corresponding events 148a, 148b overlap in the temporal sequence. In the event that there are more than two temporally overlapped segments of media, or in the event that the two overlapping segments are not in the form of an image and in the form of audio, the event-player module 274 will prompt the user to further select a single event 148n or a compatible couple of events 148a, 148b for play.

The peer-to-peer module 278 provides an interface 280 that allows a would-be user to register to send event information 108, location information 118, and time information 126 to a database 281 for storage and correlation by the correlation module 240. The peer-to-peer module 278 also allows a particular registered user to access correlated events 148a-148i, possibly through the search module 270, submitted by the particular registered user for plotting by the plot module 160 and, possibly, playing by the event-player module 274. The peer-to-peer module 278 also allows a user to access correlated events 148j-148n submitted by other users. The peer-to-peer module 278 allows the particular registered user to access events submitted by other registered users who have made the events 148j-148n available, which events 148j-148n they have submitted for access.

In certain embodiments, the peer-to-peer module 278 includes the interface 280 that allows a registered user to determine whether submitted events 148a-148n will be available to all users or restricted to certain users. In these embodiments, registered users can choose to restrict certain events 148i-148k and not others 148m-148n. Registered users who choose to restrict certain events 148i-148k are then asked to indicate the users to whom the certain events will be restricted. In certain embodiments, non-registered users may obtain access to events 148m-148n submitted by registered users. Other approaches to restricting access to events 148a-148n are considered to be within the spirit and scope of embodiments the invention in light of this disclosure.

The temporal zoom module 282 allows a user to select a segment or segments of the timeline generated by the plot module 160 for display on the z-axis 176 by the plot module 160. Depending on the embodiment, the timeline generated by the plot module 160 may span millennia or nanoseconds. The temporal zoom module 282 allows a user to select any segment of the timeline, whether larger or smaller than the previous segment, to magnify or obscure events 148a-148n plotted on the timeline.

In certain embodiments, the temporal zoom module 282 may include a user interface 284 displaying the timeline with a cursor (not shown) that may be directed by a user to a point on the timeline. The user interface may also include a plus and a minus button that allows the user to zoom in or zoom out with respect to the cursor's position along the timeline. In additional embodiments, the user interface may provide a field for the user to type in the desired range of the timeline for display. Additional or alternative embodiments that facilitate the capability to control the portion of the timeline displayed may be included without limitation.

The location zoom module 286 provides a user interface 288 that allows a user to select a segment or segments of at least one of an x-axis 168, a y-axis 172 for display by the plot module 160. In certain embodiments, the location zoom module 286 may include a user interface displaying either the x-axis 168, the y-axis 172, or the x-axis 168 and the y-axis 172 with a cursor (not shown) that may be directed by a user to a point with respect to any or both of axes 168, 172. The user interface 288 may also include a plus and a minus button that allow the user to zoom in or to zoom out with respect to the cursor's position along any or all of the axes 168, 172. In additional embodiments, the user interface 288 may provide a field for the user to type in the desired range along any of the aforementioned axes 168,172 for display. Additional embodiments that facilitate the capability to control the portion of the axis or axes 168,172 displayed will may be implemented without limitation.

The event horizon module 290 is related to the location zoom module 286. When the user applies the zoom module 286 to zoom into the x-axis 168 and the y-axis 172 beyond a certain threshold level along the x-axis 168 and the y-axis 172, the event horizon converts the z-axis 176 from a time line into a third axis on which to plot location information. In certain embodiments event horizon module 294 then plots events 148*a*-148*n* in three dimensions with the location information 118. In other embodiments, the event horizon module 294 directs the plot module 160 to plot events 148*a*-148*n* in three dimensions with the location information 118.

In certain embodiments, the events 148*a*-148*n* plotted by the plot module 160 are displayed with the aid of identifying text, points, symbols, icons, images, and/or graphics (not shown). The lens module 294 provides a cursor (not shown) with the general appearance of a lens that can be navigated within the Cartesian coordinate system 164 generated by the plot module 260. When the cursor overlaps an event 148, the cursor magnifies, or increases the size of the text, point, symbol, icon, image, or graphic used to display the event 148*n* on the Cartesian coordinate system 164.

Figure 3:
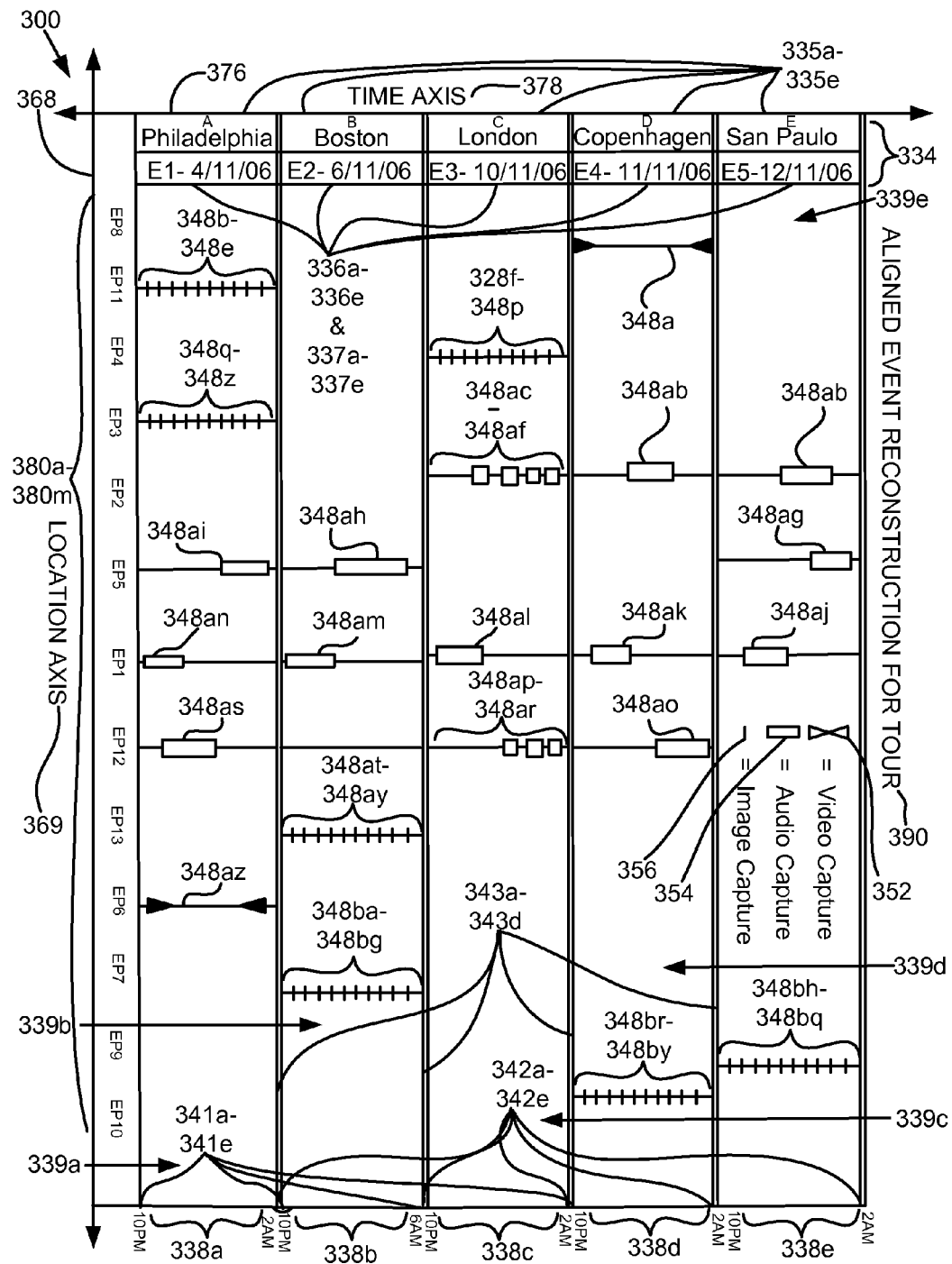
FIG. 3 is a diagram illustrating one embodiment of an interface configured to display a view of events by time and place where time is defined in terms of events in accordance with the present invention.

FIG. 3 is a diagram illustrating one embodiment of an interface 300 configured to display a view of events by time and place where time may be defined in terms of events in accordance with the present invention. The interface 300 includes an x-axis 368. Adjacent to the x-axis 368 is an x-axis label 369 identifying the x-axis. The x-axis label 369 reads "LOCATION AXIS" insofar as the x-axis 368 is often used by embodiments to plot location information 118. However, the x-axis 368 of the interface 300 of FIG. 3 does not provide information about location, but rather a series of event paths 380*a*-380*m* substantially similar to the event path 180 discussed above with respect to FIG. 1. The location information 118 is displayed by the interface 300 together with the time information 126 on the z-axis 376 of the interface 300. Adjacent to the z-axis 376 is a z-axis label 378 identifying the z-axis 376. The z-axis label 378 of the interface 300 reads "TIME AXIS," insofar as the z-axis 376 is often used by embodiments to define a timeline.

However, the interface 300 uses the z-axis 376 to define a series of primary events 334 by providing location tags 335*a*-335*e*, event tags 336*a*-336*e*, date tags 337*a*-337*e*, individual timelines 338*a*-338*e* for each primary event 339*n* in the series of primary events 334. The series of primary events 334 displayed by the interface 300 represent a tour made up of individual concerts that are represented by individual primary events 339*a*-339*e*.

The interface 300 arranges the primary events 339*a*-339*e* along the z-axis 376 in chronological order, from earliest at the bottom to most recent at the top. For each primary event 339*n*, the interface 300 displays a location tag 335*n*, which names the city where the concert that describes the associated event 339*n* was held. Additionally, for each primary event 339*n*, the interface 300 displays an event tag 336*n*, which provides an identifying code unique to the particular primary event 339*n*. Also, for each primary event 339*n*, the interface 300 displays a date tag 337*n*, which states the date of the particular primary event 339*n*. Furthermore, for each primary event 339*n*, the interface 300 provides an individual timeline 338*n* that provides a timeline for secondary events 348*a*-348 by occurring during the particular primary event 339*n*. (Dave, please clarify the nomenclature for these secondary events. (348*a*?-348*by*?))

The timelines 338*a*-338*e* include a start time 341*a*-341*e* and an end time 342*a*-342*e*. Each individual time line 338*n* occupies the same length of the z-axis 376. Therefore, in the embodiment depicted in FIG. 3, since the start times 341*a*-341*e* and the end times 342*a*-342*e* describe different time intervals, each individual time line 338*n* has its own scale. In other embodiments, the time lines share the same scale. Between any two time lines 338*x*, 338*y* exists a spacer 343*a*-343*d* of uniform length along the z-axis 376.

The interface 300 displays secondary events 348*a*-348*by* occurring at the same location and during the same time frame as one of the primary events 339*a*-339*e*. Each secondary event 348*x* is associated with a particular event path 380*x*. The plot module 160 plots each secondary event 348*x* in the timeline 338*x* pertaining to the primary event 339*x* occurring at the same location and during the same time.

The plot module 160 depicts each secondary event 348*x* by at least one of a video capture icon 352, an audio capture icon 354, and an image capture icon 356, indicating the capture through a certain type of media that corresponding to the secondary event 348*x*. The length and location, with respect to a particular timeline 338*x*, of a video capture icon 352 or an audio capture icon 354 used to depict a secondary event 348, indicates the time frame covered by the relevant media capture. The interface 300 also displays a title 390, explaining the information depicted.

Figure 4:
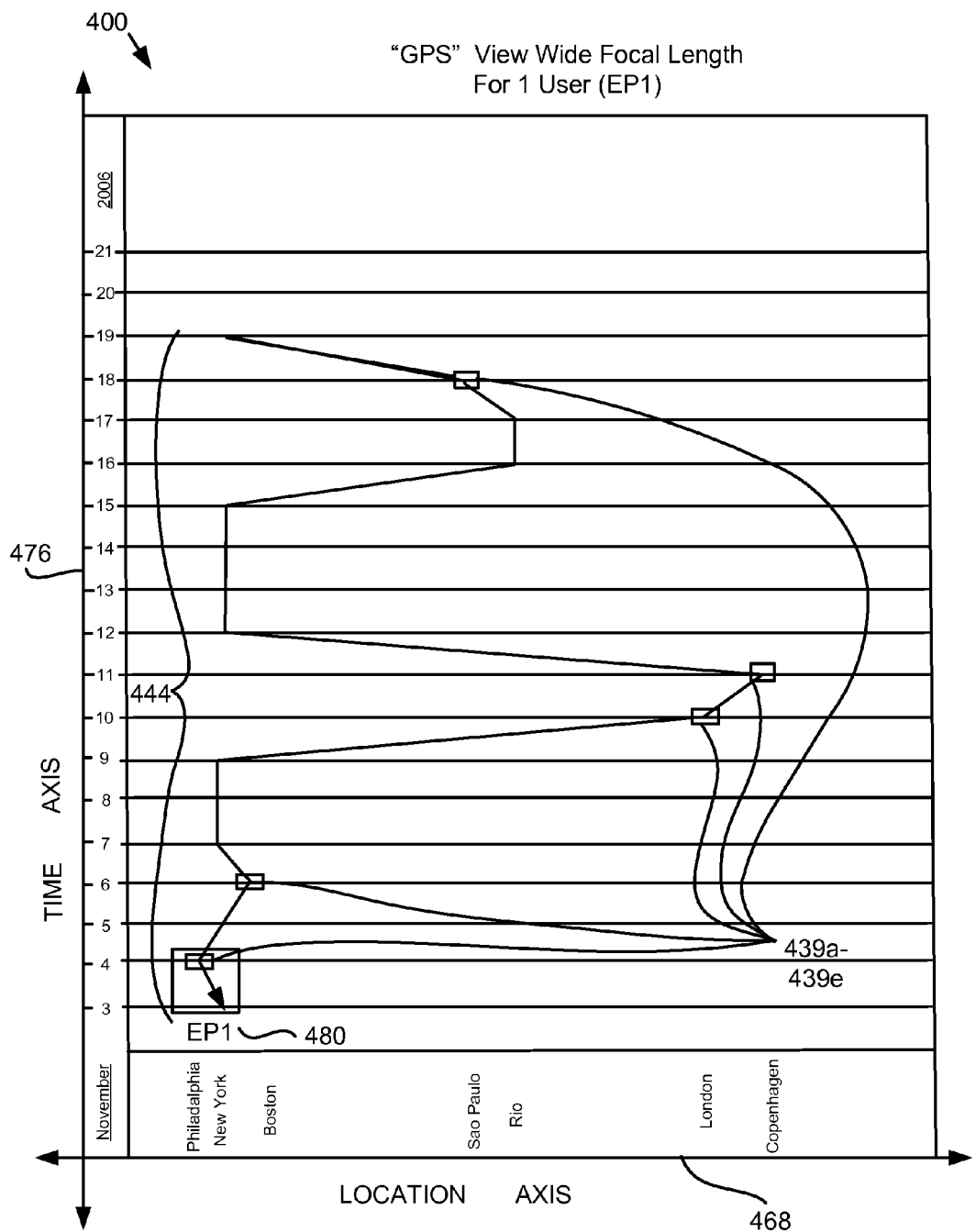
FIG. 4 is a diagram illustrating one embodiment of an interface configured to display a wide-focal-length view of events in terms of time and place in accordance with the present invention.

FIG. 4 is a diagram illustrating one embodiment of an interface 400 configured to display a wide-focal-length view of events in terms of time and place in accordance with the present invention. The interface 400 includes an x-axis 468 used to indicate location and a z-axis 476 used to indicate time. Various locations are indicated along the x-axis 468 in terms of city names. Many of the city names correspond to the location tags 335*a*-335*e* describing the primary events 339*a*-339*e*—representing concerts—in FIG. 3. Various times are indicated along the z-axis 476 in terms of days from the month of November of 2006 that each occupy an equal amount of the z-axis 476.

The plot module 160 plots a series of events 444 on the interface 400 corresponding to a capture of position information provided by the record module 120. In the case of FIG. 4, the record module 120 most likely would include a GPS 104 that captures position and time information that is correlated by the correlation module 140 for plotting by the plot module 160.

The series of events 444 makes up an event path 480 substantially similar to the event paths 180, 380*a*-380*m* depicted in FIG. 1 and FIG. 3. In FIG. 4, the plot module 160 plots the series of events 444 at intervals of one day each. Primary events 439*a*-439*e* indicate that the user associated with the event path 480 was present at the concerts making up the primary events 339*a*-339*e* in FIG. 3. In certain embodiments, the user associated with the event path 480 inputs location information 118 and the time information 126 manually, instead of relying on a GPS 104.

Figure 5:
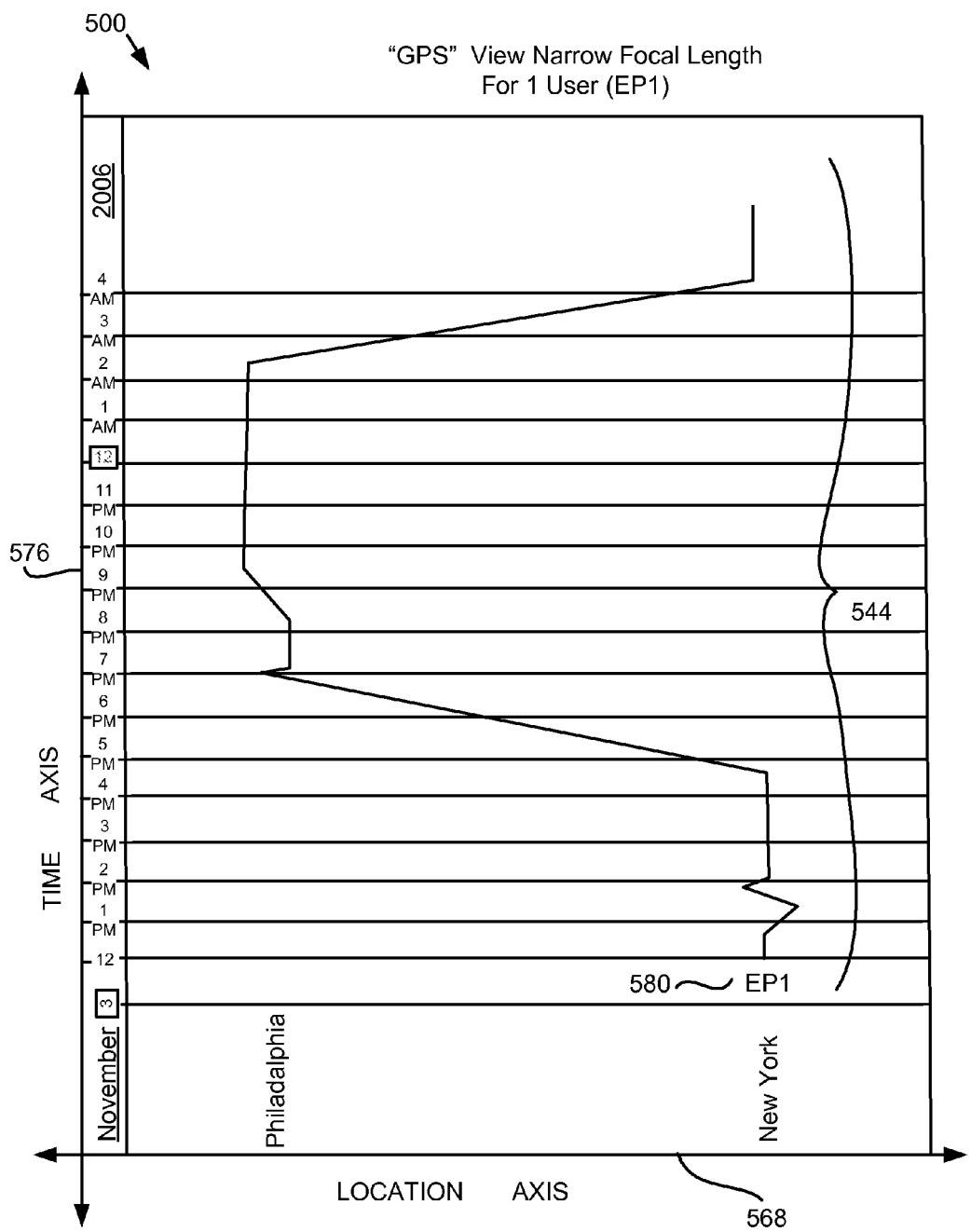
FIG. 5 is a diagram illustrating one embodiment of an interface configured to display a narrow-focal-length view of events in terms of time and place in accordance with the present invention.

FIG. 5 is a diagram illustrating one embodiment of an interface 500 configured to display a narrow-focal-length view of events in terms of time and place in accordance with an embodiment of the present invention. The interface 500 includes an x-axis 568 used to indicate location and a z-axis 576 used to indicate time. Various locations are indicated along the x-axis 568 in terms of city names. However, although the two city names that appear in FIG. 5 also appear in FIG. 4, fewer city names are depicted in FIG. 5. Also, the various times indicated along the z-axis 476 are in hours as opposed to the diurnal time intervals in FIG. 4.

In FIG. 5, a user of the interface 500 has used the temporal zoom module 282 to select a narrower segment of the timeline along the z-axis 576 than the segment of the timeline appearing along the z-axis 476 in FIG. 4. The user has selected a segment of the timeline limited in terms of two days from the month of November of 2006 instead eighteen, as in FIG. 4. The selection allows the plot module 160 to plot a series of events 544 with a finer level of granularity, both in terms of time and in terms of location.

The plot module 160 plots a series of events 544 on the interface 500 corresponding to a capture of position information provided by the record module 120. The series of events 544 correspond to a single event path 580 substantially similar to the event paths 180, 380a-380m, 480 described with respect to FIG. 1, FIG. 3 and FIG. 4. In the case of FIG. 5, the record module 120 most likely would include a GPS 104 that captures position and time information that is correlated by the correlation module 140 for plotting by the plot module 160. However, unlike FIG. 4, the interface 500 in FIG. 5 plots the series of events 544 at hourly intervals as opposed to diurnal intervals. Additionally, since the event path 480 does not travel such large distances in the shortened segment of the timeline involved in FIG. 5, the x-axis 568 is able to also display location at a heightened level of granularity. The interface 500 of FIG. 5 displays movements of location within cities, not just between cities as in FIG. 4.

Figure 6:
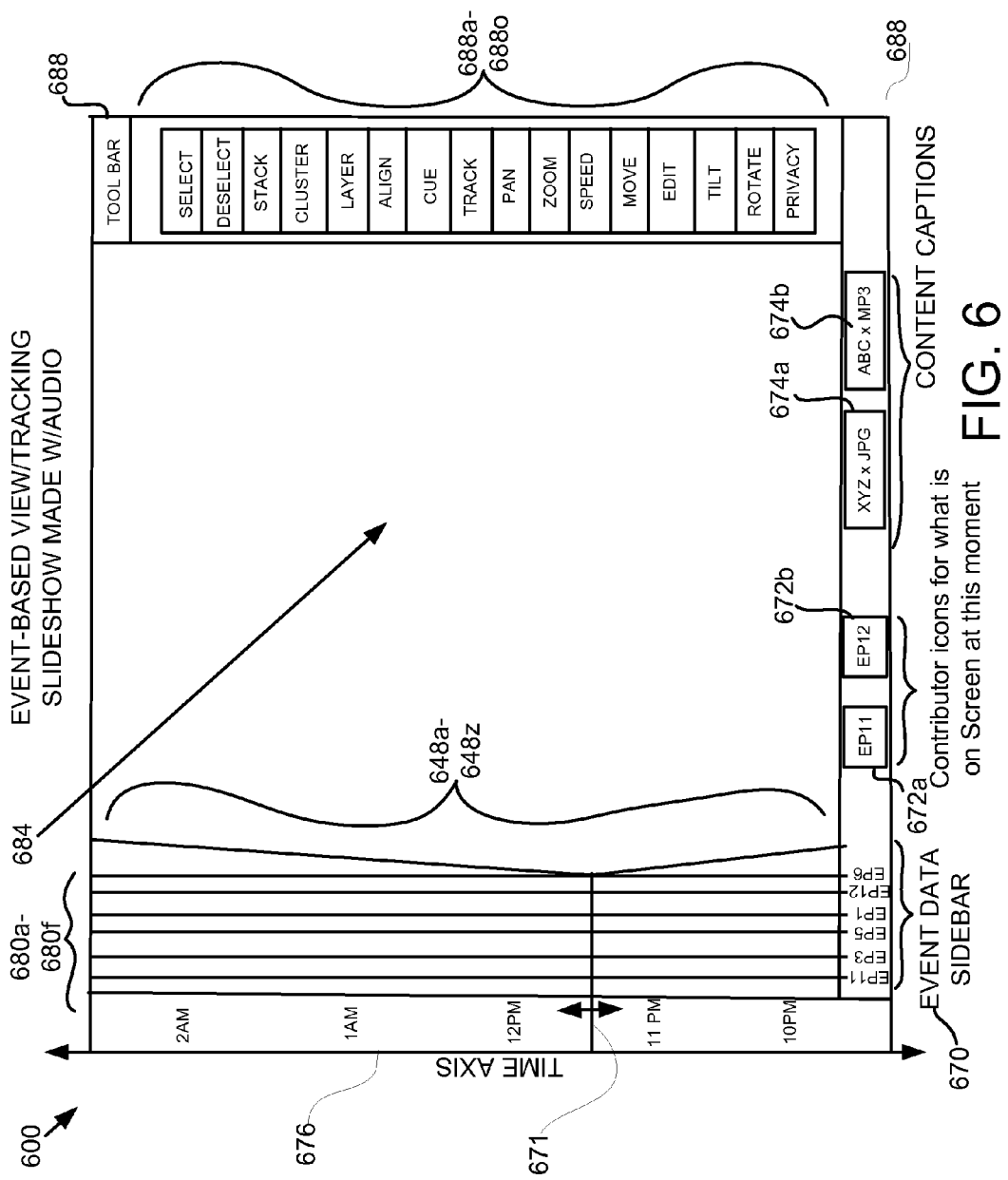
FIG. 6 is a diagram illustrating one embodiment of an event-player interface in accordance with the present invention.

FIG. 6 is a diagram illustrating one embodiment of an event-player interface 600 in accordance with the present invention. The event-player interface 600 includes an x-axis 668 and a z-axis 675. The x-axis 668 includes an event path sidebar 670, contributor icons 672a. 672b, and content captions 674a, 674b. The event-player interface 600 also includes a display area 684 and a tool bar 686. These elements work together to display and to play events that include captures of media information.

The z-axis 676 represents a segment of time selected by a user with the temporal zoom module 286. The event path sidebar 670 along the left-hand side of the x-axis 668 includes multiple event paths 680a-680f. A user selects each event path 680 with the aid of any combination of the search module 270, the temporal zoom module 286, the location zoom module 290, or by other methods without limitation.

The event-path sidebar 670 also includes a cursor 671 that a user can position with respect to a chosen time on the z-axis 676. Once the user positions the cursor 671, in several embodiments, the cursor travels from the bottom to top of the z-axis 767 in real time relative to the units of time demarcating the z-axis 676. In other embodiments, the cursor 671 travels at a speed defined by the user. As the cursor moves up the z-axis 676, the event-player interface 600 displays or plays the media associated with particular events 648a-648z in the various event paths 680a-680f. In certain embodiments, the event-player interface 600 will display media in the form of an image at the same time as media in the form of audio, where the two corresponding events 648a, 648b overlap in the temporal sequence. In the event that there are more than two temporally overlapped segments of media or in the event that the two overlapping segments are not in the form of an image and in the form of audio, the event-player interface 600 will prompt the user to further select a single event path 680n or a compatible couple of event paths 680x, 680k.

For example, as the cursor moves from bottom to top in FIG. 6, the display area 684 first plays the audio from for event 648y in event path 680d. The various types of media are denoted by the symbols set forth in FIG. 3, where a dash represents an image 356 and a dark bar represents audio 354, as in FIG. 3. When the cursor reaches the first image 640m in event path 680b, the display area 684 displays the image 648m while the event-player interface 600 continues to play the audio 648y. Then the display area 684 continues to display the first image 648m in the event path 680b until the cursor 671 arrives at another image 648a in event path 680a; at which time, the display area 684 displays the new image 648a. The event-player interface 600 continues to play the audio 648y from event path 680d until the audio has played itself out.

The contributor icons 672a and 672b indicate which event paths 680a-680b correspond to the events 648f, 648z currently displayed in the display area 684 and/or played by the event-player interface 600. The content captions 674a, 674b provide a file name corresponding to the events 648f, 648z currently displayed in the display area 684 and/or played by the event-player interface 600, together with an extension indicating the format of the media.

The event-player interface 600 includes the tool bar 686 that provides an array of functions 688a-688p that allow a user to select 688a, deselect 688b, stack 688c, cluster 688d, layer 688e, align 688f, cue 688g, and track 688h event paths 680 for display or play by the event-player interface 600. The tool bar 686 also includes functions 688 that allow a user to pan 688i, zoom 688j, move 688l, edit 688m, tilt 688n, and rotate 688o images or video corresponding to events 648a-648z. Furthermore, the tool bar 686 includes a function 688 that allows the user to control the speed 688k at which the cursor 671 moves up the z-axis 676. Additionally, the tool bar 686 includes a privacy function 688p that allows a user to restrict access to a particular event path 680n, a particular event 648n, or any combination of the same.

Figure 7:
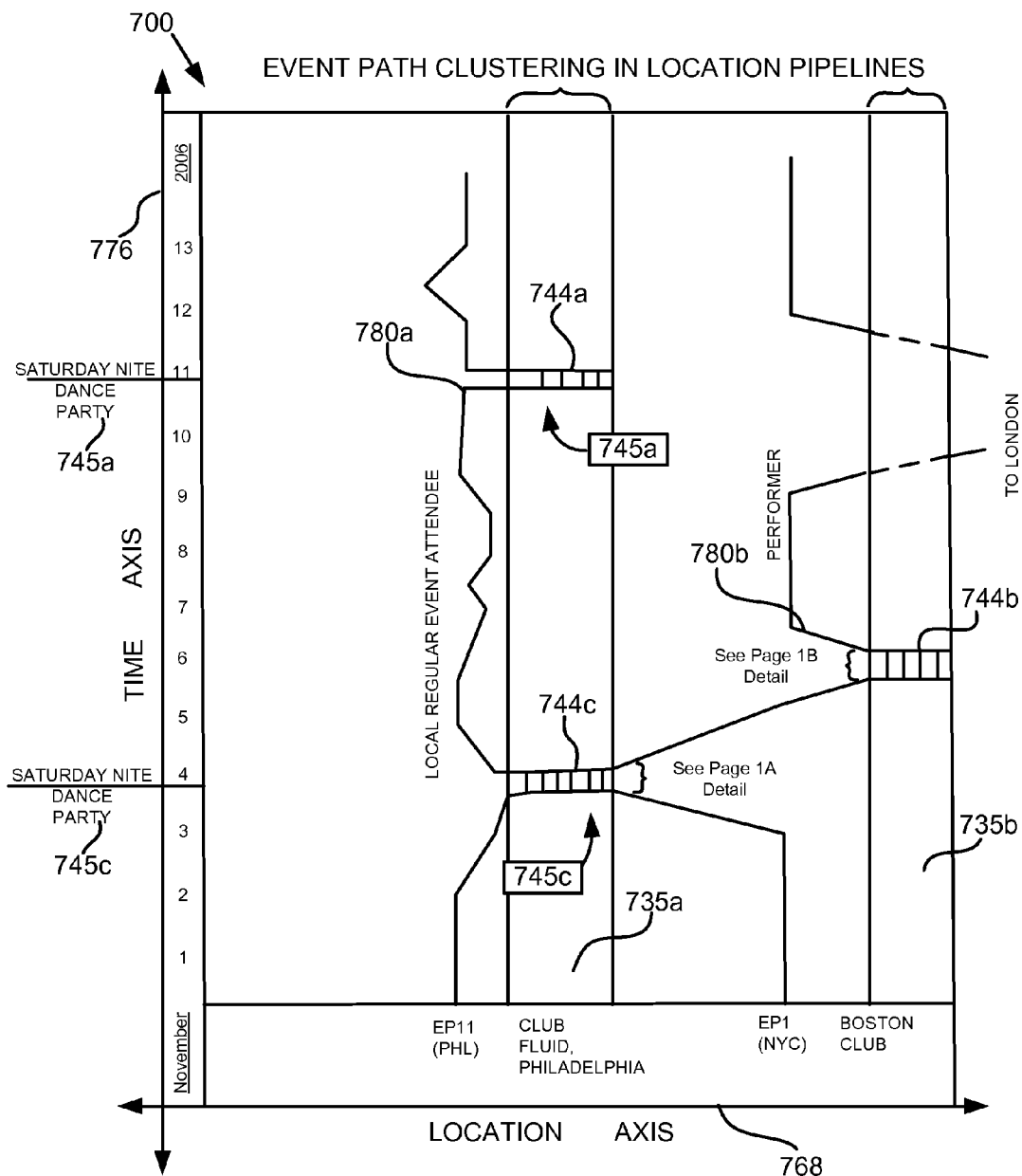
FIG. 7 is a diagram illustrating one embodiment of an interface configured to display the clustering of event paths in accordance with the present invention.

FIG. 7 is a diagram illustrating one embodiment of an interface 700 configured to present the clustering of event paths in accordance with an embodiment of the present invention. The event-player interface 700 includes an x-axis 768 and a z-axis 776. The x-axis 768 indicates the location for various event paths 780a, 780b and location pipelines 735a, 735b. The z-axis 776 provides a timeline with equally spaced diurnal increments, with various days from the November 2006 in this example.

Locations plotted with respect to the x-axis 768 are not plotted to scale. For example, the location pipelines 735a, 735b, which represent two dance clubs, occupy a disproportionate amount of the x-axis 768, which is arranged to accommodate the selected event paths 780a, 780b and location pipelines 735a, 735b. A location pipeline 735 represents a particular location. A location pipeline can be used to cluster a group of event paths 780.

A cluster of event paths 744 displays all of the event paths 780a-780n present at a certain location by displaying the event paths 780a-780n in a particular location pipeline 735n. In FIG. 7, three distinct clusters 744a, 744b, 744c are displayed. The first and third clusters 744a and 744c have accompanying name tags 745a, 745c identifying the clusters 744a, 744c. The second cluster 744b is not fully displayed by the interface 700 and has no accompanying name tag 745. In certain embodiments, the displayed clusters 744a, 744b, 744c may represent the times at which a location pipeline is open to the public or may represent time frames selected by a user.

Figure 8:
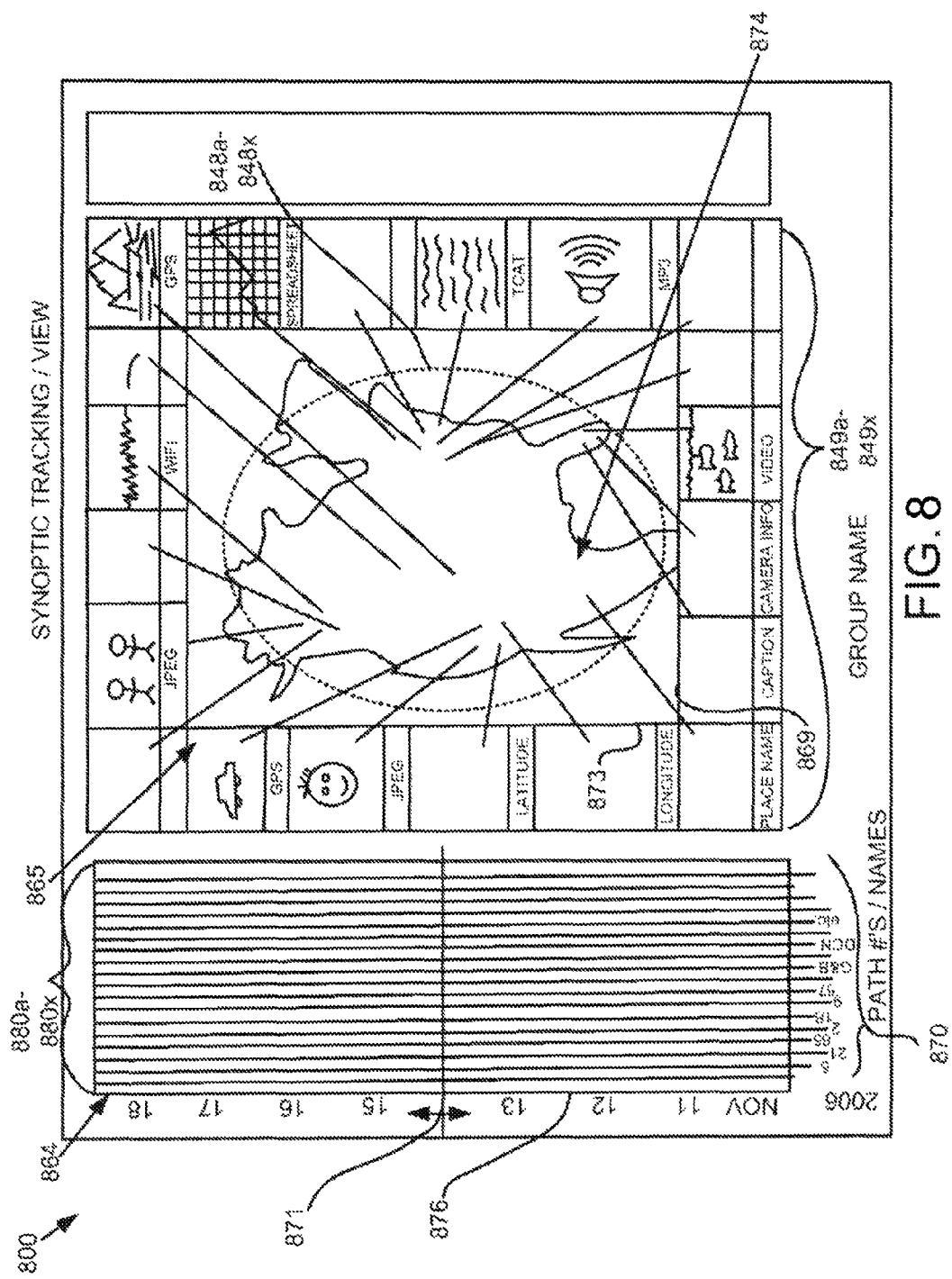
FIG. 8 is a diagram illustrating one embodiment of an interface configured to display a synoptic tracking view of events in accordance with the present invention.

FIG. 8 is a diagram illustrating one embodiment of an interface 800 configured to display a synoptic tracking view of events in accordance with the present invention. The interface 800 of FIG. 8 includes a first coordinate system 864 and a second coordinate system 865. The first coordinate system 864 includes a z-axis 876, a series of event paths 870, and a cursor 871. The z-axis 876 defines the temporal progression of the event paths 880a-880x in the series of event paths 870. As the cursor 871 progresses along the timeline described by the z-axis 876, the plot module 160 plots the last event 848 encountered by the cursor 871 on the first coordinate system 865.

The second coordinate system 865 includes a second x-axis 869 and a second z-axis 873 upon which, in certain embodiments, the plot module 160 plots a map 874. The plot module 160 plots the last event encountered among the events 848a-848x by the cursor 871 for each event path 880a-880f on the second x-axis 869 and the second z-axis 873 in relation to the map 874. Corresponding to each event 848a-848x is an event information box 849a-849x. Each event information box 849a-849x includes a graphic, image, or symbol associated with the event 848a-848x to which it pertains and a caption indicating the nature of the capture of information associated with the event to 848a-848x.

Figure 9:
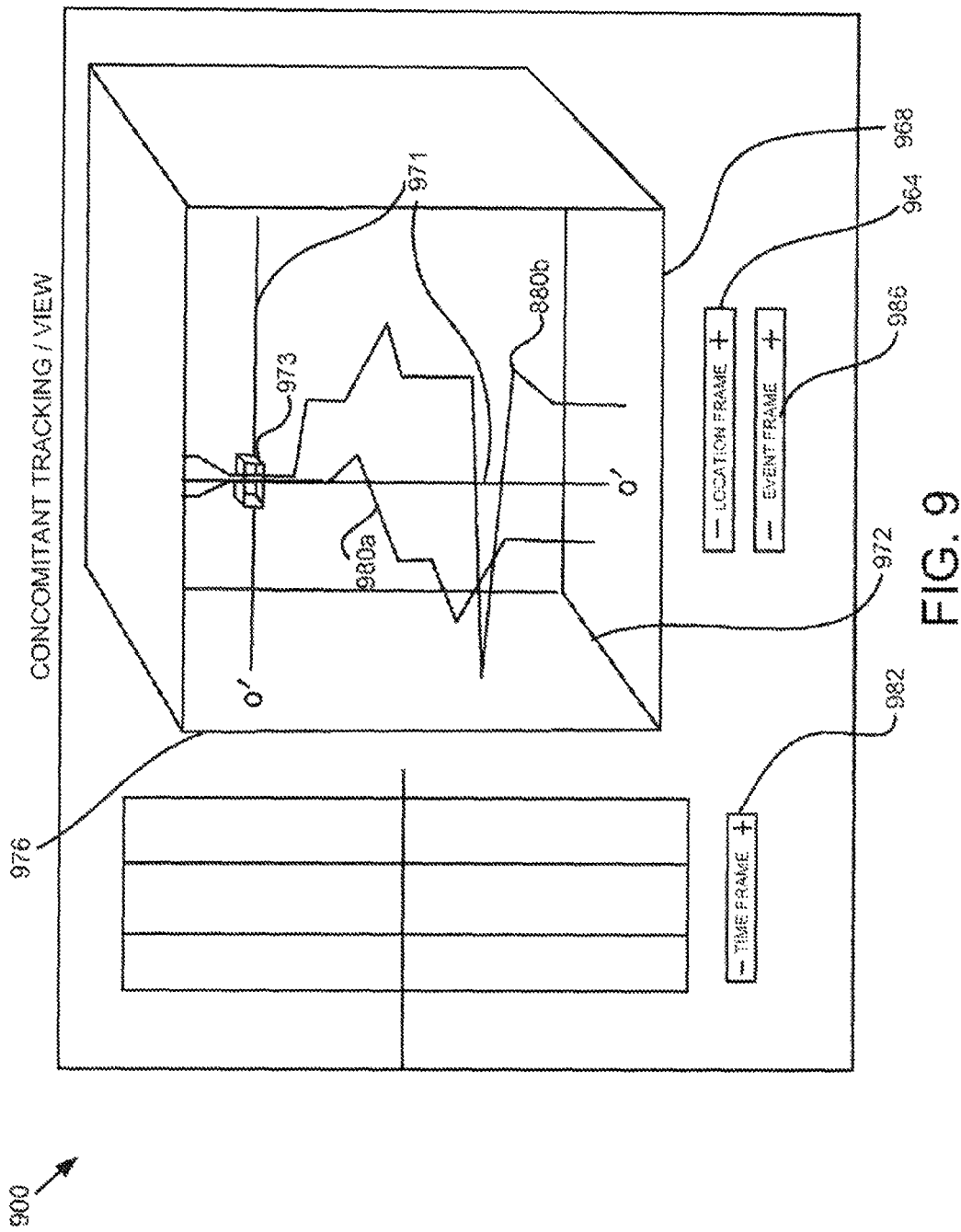
FIG. 9 is a diagram illustrating one embodiment of an interface configured to display a concomitant-tracking view in accordance with the present invention.

FIG. 9 is a diagram illustrating one embodiment of an interface 900 configured to display a concomitant-tracking view in accordance with the present invention. The interface 900 includes an x-axis 968, a y-axis 972, and a z-axis 976. The plot module 160 uses the x-axis 968 and the y-axis 972 to plot the location of event paths 980a, 980b in two-dimensions. The plot module 160 uses the z-axis 976 to plot the time of event paths 980a, 980b.

A user is able to navigate the interface with a cross-hair cursor 971 that, in certain embodiments, displays coordinates with respect to the x-axis 968, the y-axis 972, and the z-axis 976. At the center of the cross-hair cursor 971 is an event lens 973 that can increase the size of any image, graphic, symbol, or text (not shown) associated with an event (not shown) covered by the event lens 973.

Also, the interface 900 includes a time frame button 982 that allows the user, in certain embodiments, with the aid of the temporal zoom module 282, to increase or decrease the segment of the time line displayed on the z-axis 976. Additionally, the interface 900 includes a location frame button 984 that allows the user, in certain embodiments with the aid of the location zoom module 286, to increase or decrease the area displayed on the x-axis 968 and/or the y-axis 972. Furthermore, the interface 900 includes an event frame button 986 that allows the user, in certain embodiments, with the aid of the lens module 294, to increase or to decrease the size of any image, graphic, symbol, or text (not shown) associated with an event (not shown) covered by the event lens 973.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
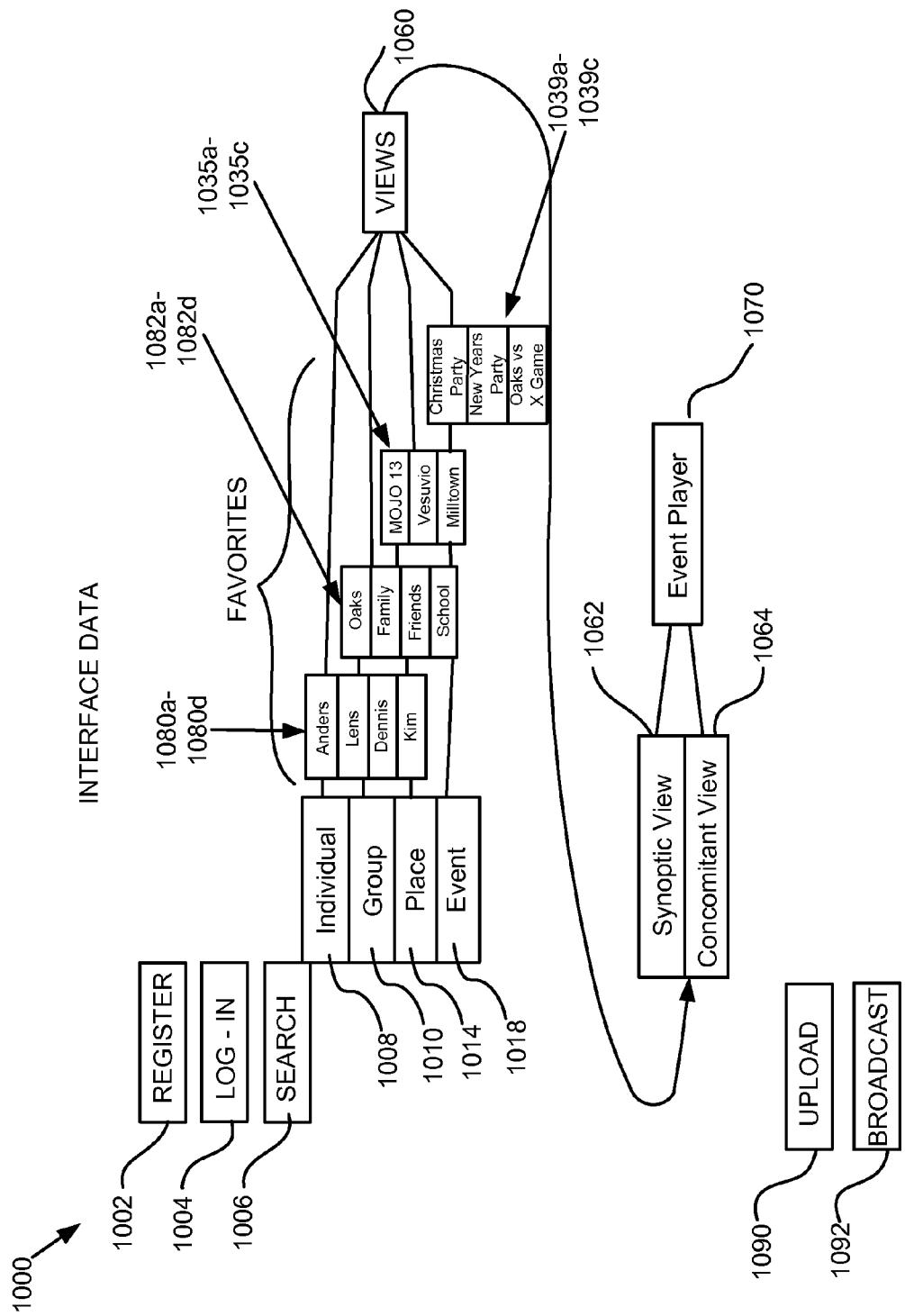
FIG. 10 is a schematic flow chart diagram illustrating the relationships between the various interfaces of one embodiment in accordance with the present invention.

FIG. 10 is a schematic flow chart diagram 1000 illustrating the relationships between the various interfaces of one embodiment in accordance with the present invention. The diagram 1000 illustrates register 1002, log-in 1004, search 1006, view 1060, event player 1070, upload 1090, and broadcast 1092 interfaces. Together, these interfaces work to organize information about events in terms of time and space.

In certain embodiments, the peer-to-peer module 278 generates a register interface 1002 that allows a would-be user (not shown) to register to send event information 108, location information 118, and time information 126 to a database for storage and correlation by the correlation module 240. The register interface 1002 collects information about the would-be user, such as a name and email address. The register interface 1002 also allows the would-be user to set a password to gain access to event information 108, location information 118, and time information 126 stored by the particular user and other users. Additionally, in certain embodiments, the register interface 1002 acquires information about Uniform Resource Locators (URLs) and protocols necessary for the would-be user to upload information to the database via an Internet connection (not shown). In certain embodiments, the register interface 1002 acquires the information about URLs and protocols with software downloaded on the computer of the would-be user. In other embodiments, the register interface 1002 acquires the information in fields with associated queries to the would-be user.

The peer-to-peer module 278 also generates a log-in interface 1004, capable of receiving a password from a registered user (not shown). A password (not shown) matching the password of a registered user in a password database (not shown) prompts the search module 270 to generate the search interface 1006. A password without a match results in an error single from the log-in interface 1004 and a request for a new password.

The search interface 1006 allows a registered user to access the database (not shown) via a network connection (not shown) to search event information 108, location information 118, and time information 126 stored by the registered user and by other registered users. The search interface 1006 allows a registered user to search by individual 1008, group 1010, place 1014, and event 1018. A search by individual 1008 searches for event paths associated with particular individual 1080a-1080d.

A search by group 1010 searches for event paths associated with a particular group 1082a-1082d. A search by place 1014 searches for events 148a-148n occurring at a particular location to create location pipelines 1035a-1035c. A search by event 1018 searches for named events 1039a-1039c.

Once the searches input into the search interface 1006 are completed by the search module 270, the plot module 260 generates a view interface 1060. The view interface allows a user to choose between a synoptic view 1062 and a concomitant view 1064, examples of which are depicted in FIG. 8 and FIG. 9, respectively. In certain embodiments, the view interface 1060 allows for a registered user to select a number of variations on these types of views similar to interfaces shown and described herein without limitation.

The event-player module 274 allows a registered user to access the event player interface 1070 from a view or interface selected from the view interface 1060. An example of an interface useful for accessing and selecting in this way is the interface 600 shown and described with regard to FIG. 6. A registered user utilizes the upload interface 1090, powered in certain embodiments by the peer-to-peer module 278, to store event information 108, location information 118, and time information 126 to the database by using the URLs and the protocols collected by the register interface 1002. A registered user utilizes the broadcast interface 1092, powered in certain embodiments by the peer-to-peer module 278, to determine the accessibility of event information 108, location information 118, and time information 126 stored with the upload interface 1090. The broadcast interface 1092 allows a registered user to make events 148 publically available or to allow or restrict access to other registered users.

Figure 11:
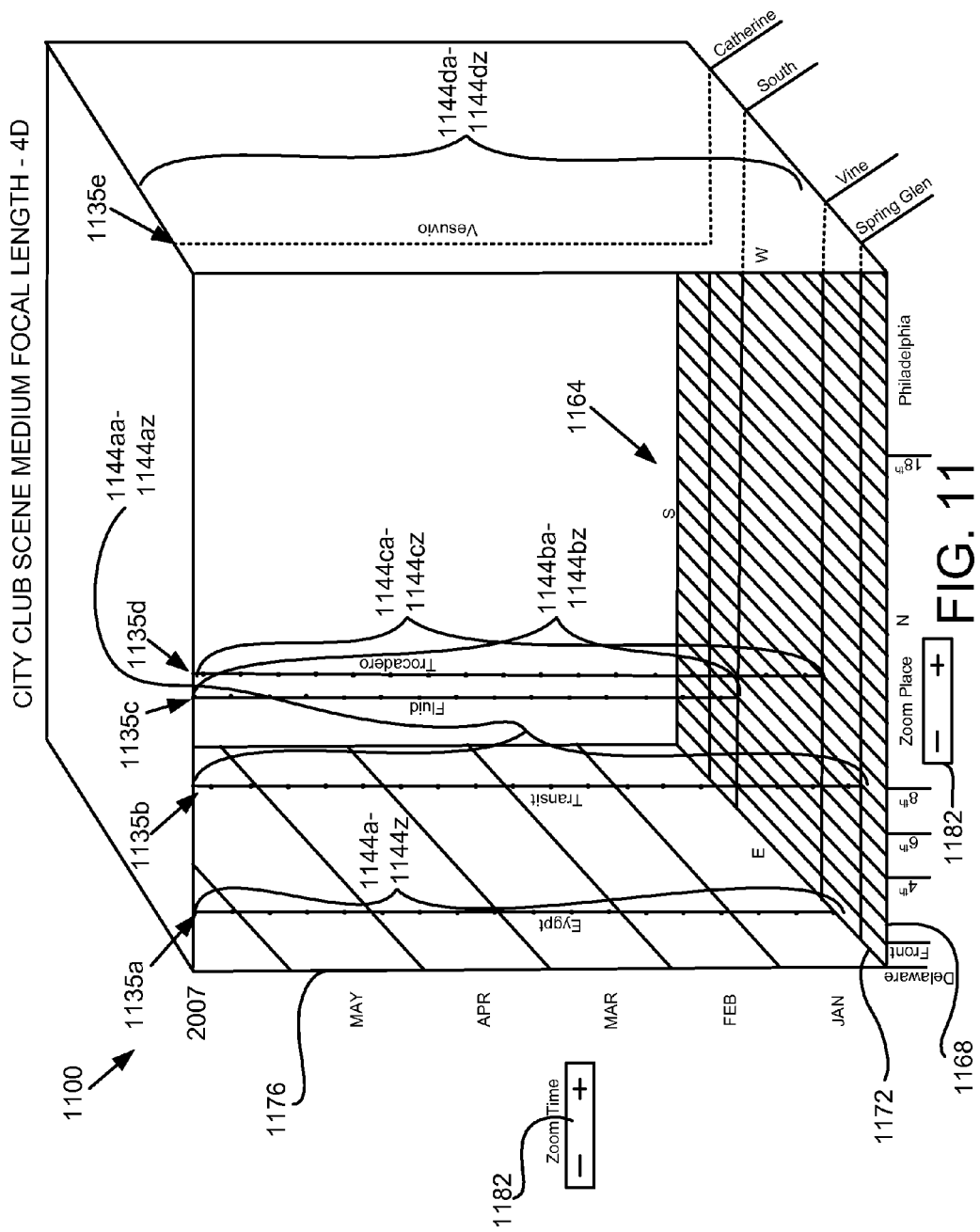
FIG. 11 is a diagram illustrating one embodiment of an interface configured to display a concomitant-tracking view using events occurring in nightclubs as an example in accordance with the present invention.

FIG. 11 is a diagram illustrating one embodiment of an interface 1100 configured to display a concomitant-tracking view using events occurring in nightclubs as an example in accordance with the present invention. The interface 1100 includes an x-axis 1168, a y-axis 1172, and a z-axis 1176. The plot module 160 uses the x-axis 1168 and the y-axis 1172 to plot a location map 1164 together with multiple location pipelines 1135a-1135e positioned relative to the location map 1164.

The z-axis 1176 defines a segment of a timeline divided by the first five or six months in 2007. Larger or smaller segments of the timeline are accessible by the zoom time button 1182. The location map 1164 plotted on the x-axis 1168 and the y-axis 1172 depicts several streets in the city of Philadelphia. Larger or smaller areas of the location map 1164 are accessible by the zoom place button 1186. Multiple location pipelines 1135a-1135e positioned relative to the location map 1164 represent various dance clubs in the city of Philadelphia.

Along the various location pipelines 1135a-1135e the plot module 160 plots multiple series' of event clouds 1144a-z through 1144da-dz. Each event cloud 1144n represents a group of events (not shown) accessible through the zoom time button 1182 and the zoom place button 1186. A cursor (not shown) may be used in certain embodiments to determine the portion of the timeline along the z-axis 1176 or the area of the location map 1164 used as a basis for zooming in or out.

Figure 12:
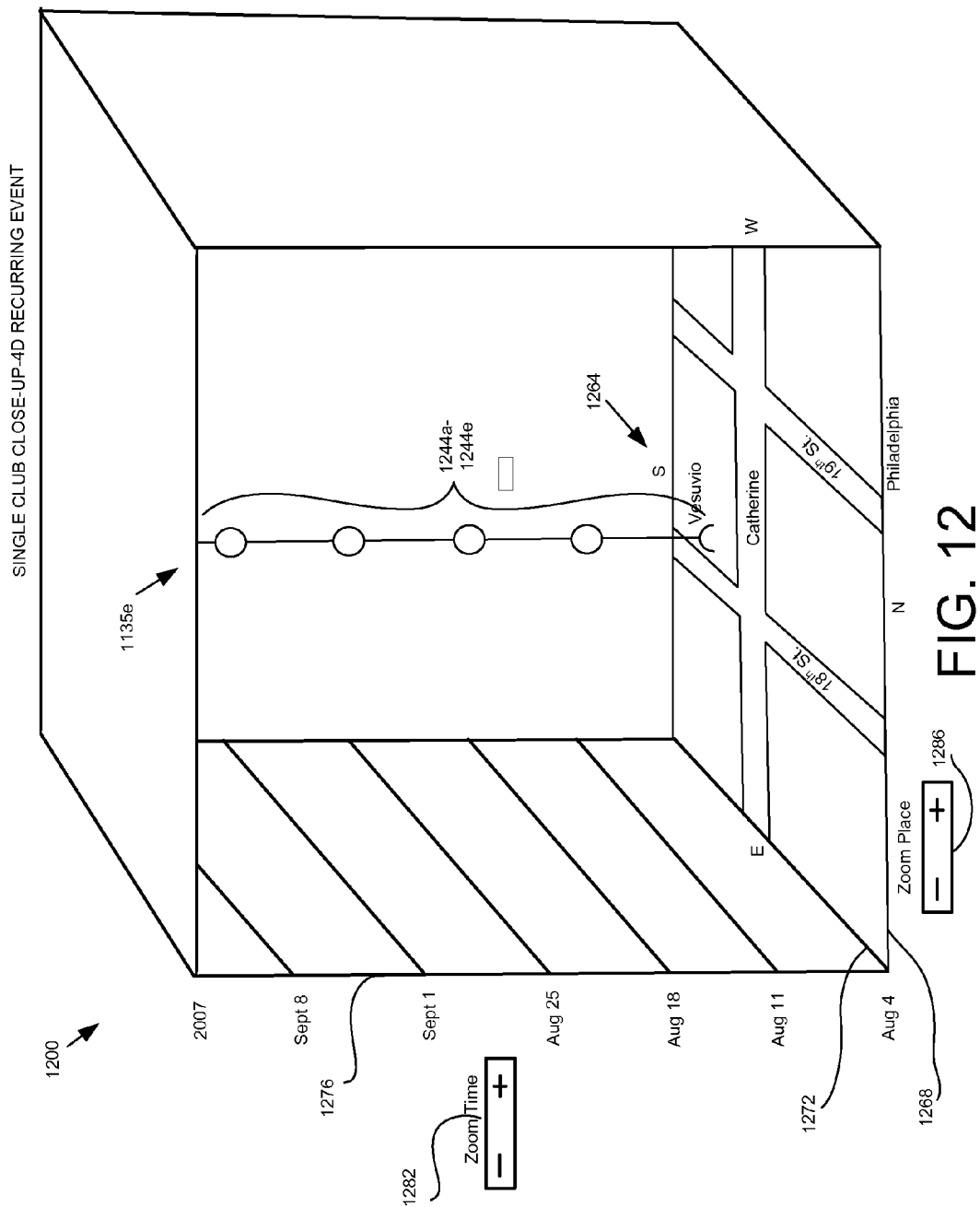
FIG. 12 is a diagram illustrating one embodiment of an interface configured to display a concomitant-tracking view zooming in to focus on the event clouds in a single nightclub in accordance with the present invention.

FIG. 12 is a diagram illustrating one embodiment of an interface 1200 configured to display a concomitant-tracking view zooming in to focus on the event clouds in a single nightclub in accordance with the present invention. The interface 1200 includes an x-axis 1268, a y-axis 1272, and a z-axis 1276. The plot module 260 plots a timeline on the z-axis 1276 and a location map 1264 on the x-axis 1268 and the y-axis 1272. However, the temporal zoom module 282 and the location zoom module 286 have been employed so that the plot module 260 plots a smaller segment of the timeline, in days as opposed to months, and a smaller area of the location map 1264 than in FIG. 11.

FIG. 12 depicts a single location pipeline 1135e from the user interface 100 of FIG. 11, representing a single dance club in the city of Philadelphia. This single location pipeline 1135e is plotted with respect to the location map 1264 which has been zoomed in relative to the map 1164 of FIG. 11, depicting more particularly various streets in the city of Philadelphia. Larger or smaller segments of the timeline 1276 are accessible by the zoom time button 1282. Additionally, larger or smaller areas of the location map 1286 are accessible by the zoom place button 1286.

FIG. 12 also depicts several event clouds 1244a-1244e. The event clouds 1244a-1244e are much larger than in FIG. 11 and represent groups of events (not shown) accessible through the zoom time button 1282 and the zoom place button 1286. A cursor (not shown) may be used in certain embodiments to determine the portion of the timeline along the z-axis 1276 or the area of the location map 1264 used as a basis for zooming in or out.

Figure 13:
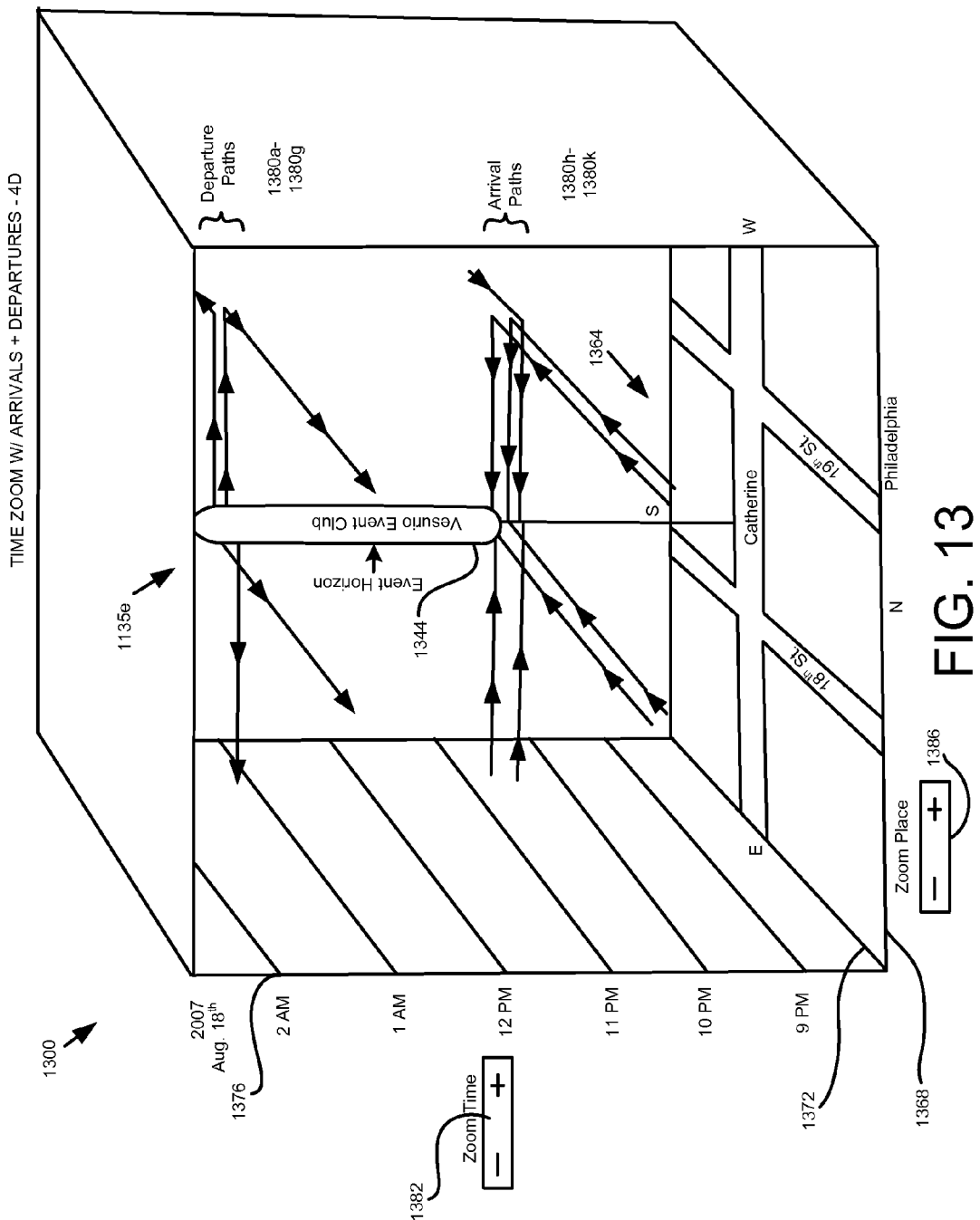
FIG. 13 is a diagram illustrating one embodiment of an interface configured to display a concomitant-tracking view zooming in to the point where individual event paths can be seen in relation to a single nightclub in accordance with the present invention.

FIG. 13 is a diagram illustrating one embodiment of an interface 1300 configured to display a concomitant-tracking view zooming in to the point where individual event paths can be seen in relation to a single nightclub in accordance with the present invention. The interface 1300 includes an x-axis 1368, a y-axis 1372, and a z-axis 1376. The plot module 260 plots a timeline along the z-axis 1376 and a location map 1364 on the x-axis 1368 and the y-axis 1372. However, the temporal zoom module 282 and the location zoom module 286 have been employed so that the plot module 260 plots a smaller segment of the timeline, in hours as opposed to days, and a smaller area of the location map 1364 than in FIG. 12.

FIG. 13 depicts a single location pipeline 1135e that is also depicted in FIGS. 11 and 12, representing a single dance club in the city of Philadelphia. The single location pipeline 1135e plotted with respect to the location map 1364, depicting various streets in the city of Philadelphia with finer granularity. Larger or smaller segments of the timeline along the z-axis 1376 are accessible by the zoom time button 1382. Additionally, larger or smaller areas of the location map 1364 are accessible by the zoom place button 1386. A cursor (not shown) may be used in certain embodiments to determine the portion of the z-axis 1376 or the point on the location map 1364 used as a basis for zooming in or out.

FIG. 13 also depicts a single event cloud 1344. The event cloud is labeled and is large enough that individual event paths 1380h-1380k can be seen entering the location pipeline 1135e, just prior to and during the event cloud 1344. Also, individual event paths 1380a-1380g can be seen leaving the location pipeline 1135e, during the event cloud 1344.

Figure 14:
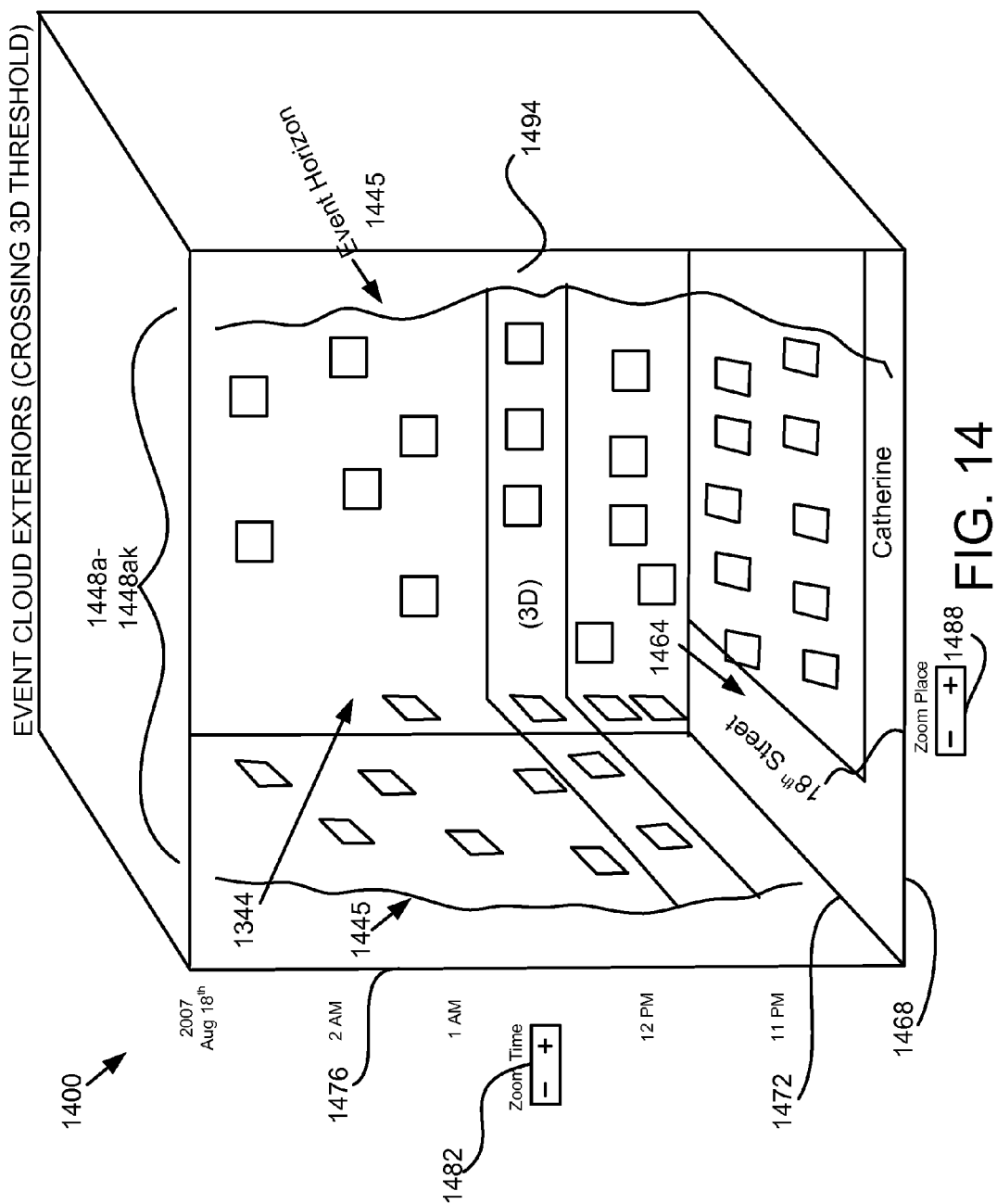
FIG. 14 is a diagram illustrating one embodiment of an interface configured to display a concomitant-tracking view zooming in to display individual events in a single nightclub in accordance with the present invention.

FIG. 14 is a diagram illustrating one embodiment of an interface 1400 configured to display a concomitant-tracking view zooming in to display individual events in a single nightclub in accordance with the present invention. The interface 1400 includes an x-axis 1468, a y-axis 1472, and a z-axis 1476. The plot module 260 plots a timeline on the z-axis 1476 and a location map 1464 on the x-axis 1468 and the y-axis 1472. However, the location zoom module 286 has been employed so that the plot module 260 plots a smaller area of the location map 1464 than in FIG. 13.

FIG. 14 depicts the single event cloud 1344 at its event horizon 1445, allowing the user to see inside the event cloud 1344. Within the event cloud 1344, the plot module 260 plots individual events 1448a-1448ak with respect to time and location. In certain embodiments, the events 1448a-1448ak may be depicted with identifying text, points, symbols, icons, images, or graphics (not shown). In certain embodiments, the event-horizon module 290 depicts an adjustable cursor 1494 along the x-axis 1468 and along the y-axis 1472 that a user may move up and down the timeline along the z-axis 1476 to select a time of interest.

Figure 15:
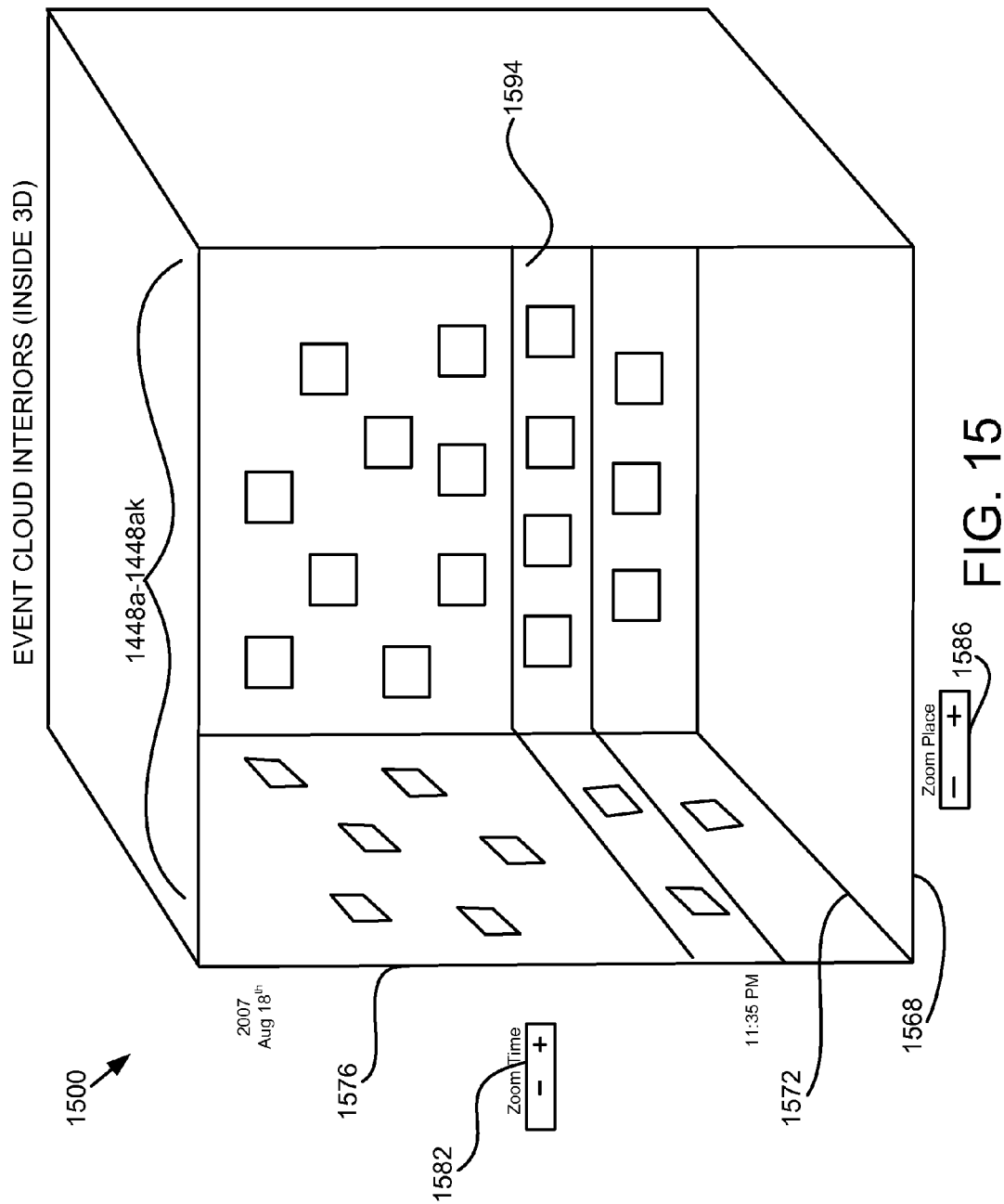
FIG. 15 is a diagram illustrating one embodiment of an interface configured to display a three-dimensional, concomitant-tracking view zoomed in to display events in three-dimensional space in a single nightclub in accordance with the present invention.

Larger or smaller segments of the timeline along the z-axis 1476 are accessible by the zoom time button 1482. Additionally, larger or smaller areas of the location map 1486 are accessible by the zoom place button 1486. However, once the user selects a location for the adjustable cursor 1494 and activates the adjustable cursor 1494, in certain embodiments, by clicking on the adjustable cursor 1494, the event-horizon module 290 participates in the generation of a new three-dimensional view of events 1448a-1448ak as depicted in FIG. 15. In certain embodiments, the event-horizon module 294 plots the three-dimensional view. In other embodiments, the event-horizon module 294 assists the plot module 290 to generate the view.

FIG. 15 is a diagram illustrating one embodiment of an interface 1500 configured to present a three-dimensional, concomitant-tracking view zoomed in to display events in three-dimensional space in a single nightclub in accordance with the present invention. The interface 1500 includes an x-axis 1568, a y-axis 1572, and a z-axis 1576. In certain embodiments, the plot module 260 plots events 1448a-1448ak with respect to the x-axis 1568, the y-axis 1572, and the z-axis 1576. In other embodiments, the event-horizon module 290 plots the events 1448a-1448ak. However, unlike previous interfaces, the z-axis 1576 in the interface 1500 of FIG. 15 defines location instead of time. Therefore, in FIG. 15, the x-axis 1568, the y-axis 1572, and the z-axis 1576 function together to plot events 1448a-1448ak in three-dimensional space.

The events 1448a-1448ak are plotted in three-dimensional space at the time selected by the adjustable cursor 1594. In the case of FIG. 15, the selected time is 11:35 p.m. In certain embodiments, the event-horizon module 294 and/or the plot module continually change the events 1448a-1448ak plotted in real time or in progressing historic time. In certain embodiments, the zoom time button 1582 can change the three-dimensional depiction of events 1448a-1448n by moving the time at which events 1448a-1448n are plotted forward and backward in time. Larger or smaller segments of the x-axis 1568, the y-axis 1572, and the z-axis 1576 are accessible by the zoom place button 1582.

Figure 16:
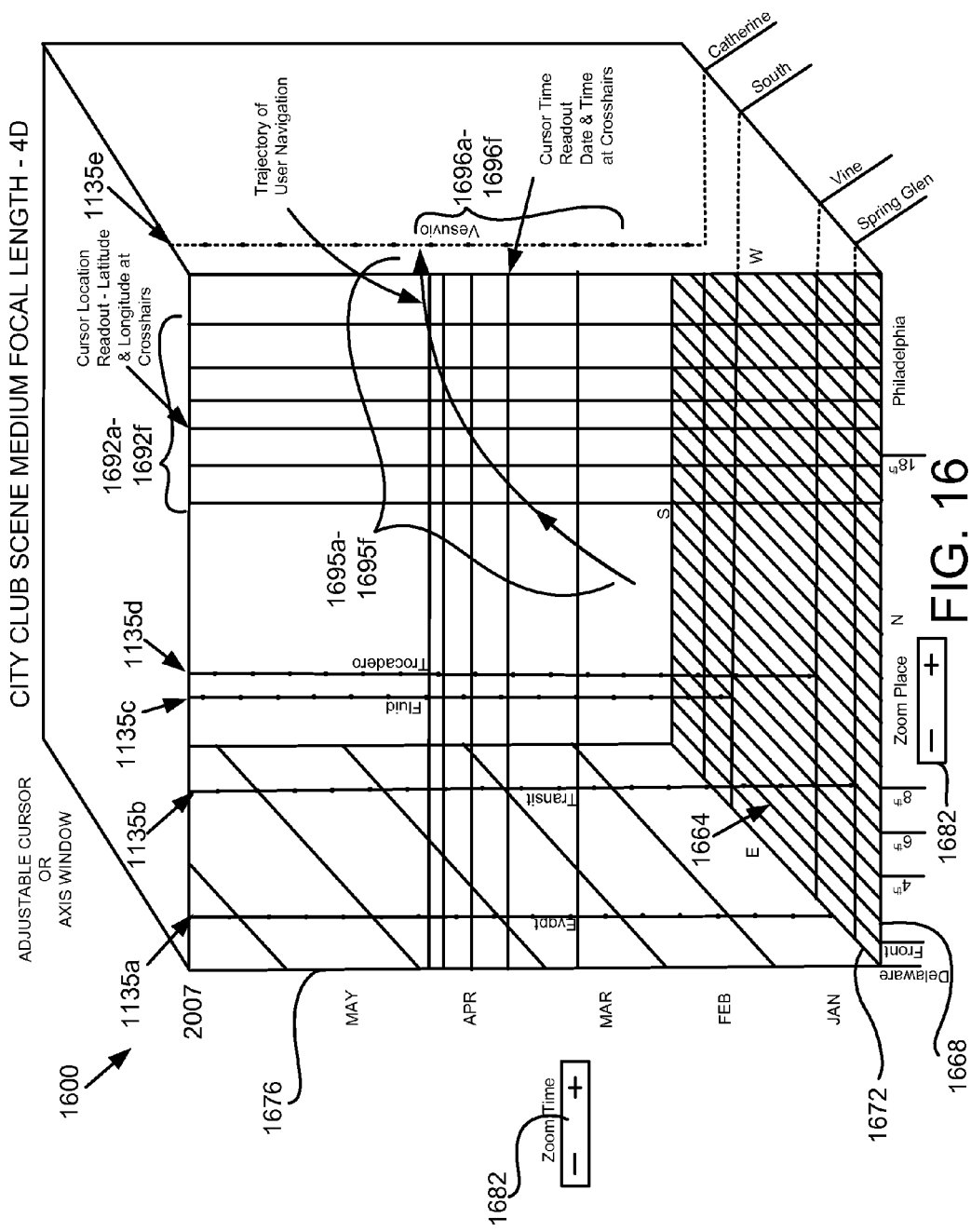
FIG. 16 is a diagram illustrating the navigation of an adjustable cursor through an interface configured to display a concomitant-tracking view.

FIG. 16 is a diagram similar to FIG. 11 illustrating the navigation of an adjustable cursor through an interface 1600 configured to display a concomitant-tracking view. The interface 1600 includes an x-axis 1668, a y-axis 1672, and a z-axis 1676. The plot module 160 uses the x-axis 1668 and the y-axis 1672 to plot a location map 1664 together with multiple location pipelines 1135a-1135e also illustrated in FIG. 11 positioned relative to the location map 1664.

The z-axis 1676 defines a segment of a timeline divided by the first five or six months in 2007. Larger or smaller segments of the timeline are accessible by the zoom time button 1682. The location map 1664 plotted on the x-axis 1668 and the y-axis 1672 depicts several streets in the city of Philadelphia. Larger or smaller areas of the location map 1664 are accessible by the zoom place button 1686. Multiple location pipelines 1135a-1135e positioned relative to the location map 1664 represent various dance clubs in the city of Philadelphia.

The interface 1600 depicts an adjustable cursor/axis window 1695 in a series of positions 1695a-1695f. The adjustable cursor/axis window 1695 is depicted at any given position 1695a-1695f as a crosshair. A user (not shown) is able to navigate the adjustable cursor/axis window 1695 with the use of a joystick (not shown) or a keyboard (not shown) within the Cartesian coordinate system generated by the x-axis 1668, the y-axis 1672, and the z-axis 1676.

FIG. 16 depicts the adjustable cursor/axis window 1695 in a series of positions 1695a-1695f that trace the trajectory of the cursor/axis window 1695. In FIG. 16, the user is navigating the cursor/axis window 1695 toward the location pipeline 1135e that depicts the dance club Vesuvio, to see what events occurred at the dance club at a particular time. Therefore, the series of positions 1695a-1695f trace the trajectory of the cursor/axis window 1695 toward the location pipeline 1135e that depicts the dance club Vesuvio.

At each position in the series of positions 1695a-1695f that trace the trajectory of the adjustable cursor/axis window 1695, the adjustable cursor/axis window 1695 includes a location axis 1692a-1692f and a time axis 1696a-1696f. The location cursor 1692 is oriented transversely relative to the x-axis 1668 and can move along the y-axis 1672 to pinpoint a location for the adjustable cursor/axis window 1695. In certain embodiments, a latitude and longitude or a location name is displayed together with the location cursor 1692. Additionally, the time cursor 1696 is oriented transversely relative to the z-axis 1676 and can move along the y-axis 1672 to pinpoint a moment in time. In certain embodiments, the moment in time is displayed together with the time cursor 1676.

Figure 17:
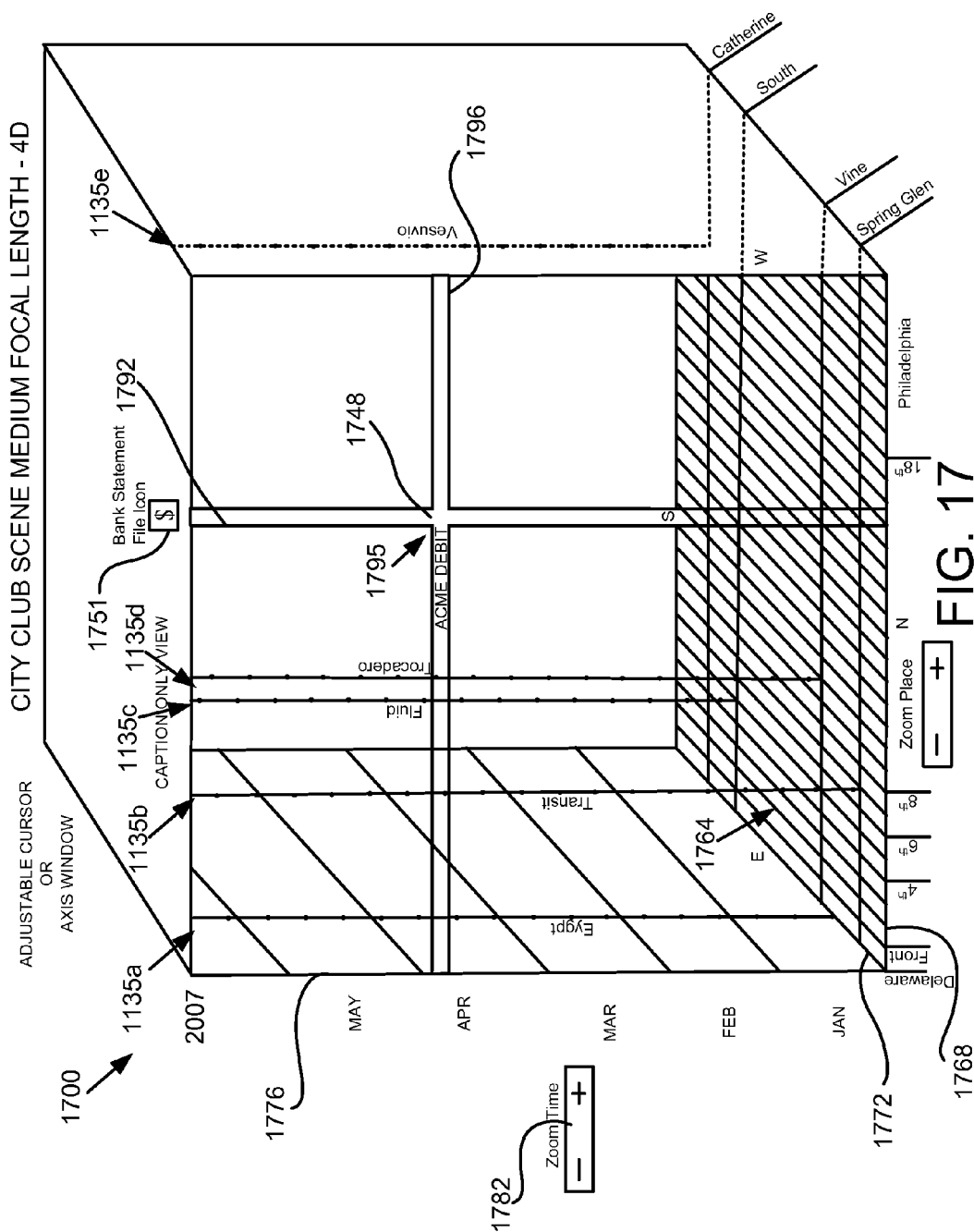
FIG. 17 is a diagram illustrating the navigation of an adjustable cursor through an interface configured to display a concomitant-tracking view, where the adjustable cursor magnifies a financial transaction event.

FIG. 17 is a diagram illustrating the navigation of an adjustable cursor through an interface 1700 configured to display a concomitant-tracking view, where the adjustable cursor magnifies a financial transaction event 1748. The interface 1700 includes an x-axis 1768, a y-axis 1772, and a z-axis 1776 on which the plot module 160 plots a location map 1764 together with multiple location pipelines 1135a-1135e.

The z-axis 1776 defines a segment of a timeline divided by the first five or six months in 2007. Larger or smaller segments of the timeline are accessible by the zoom time button 1782. Larger or smaller areas of the location map 1764 are accessible by the zoom place button 1786.

Additionally, the interface 1700 depicts an adjustable cursor/axis window 1795, with a location cursor 1792 and a time cursor 1796. The location cursor 1792 is oriented transversely relative to the x-axis 1768 and the y-axis 1772 to pinpoint a location for the adjustable cursor/axis window 1795. The time cursor 1796 is oriented transversely relative to the z-axis 1776 to pinpoint a moment in time.

The interface 1700 displays the adjustable cursor/axis window 1795 at a particular location and at a particular moment in time that coincide with a particular event 1748. The particular event 1748 may be a debit charge made at the ACME store as displayed on the adjustable cursor/axis window 1795. Additionally, the interface displays an icon 1751, indicating that the particular event 1748 is a financial transaction. As a user (not shown) navigates the adjustable cursor/axis window 1795 within the Cartesian coordinate system defined by the x-axis 1768, the y-axis 1772, and the z-axis 1776, the adjustable cursor/axis window 1795 will similarly display any additional events that occupy the same position in the Cartesian coordinate system.

Figure 18:
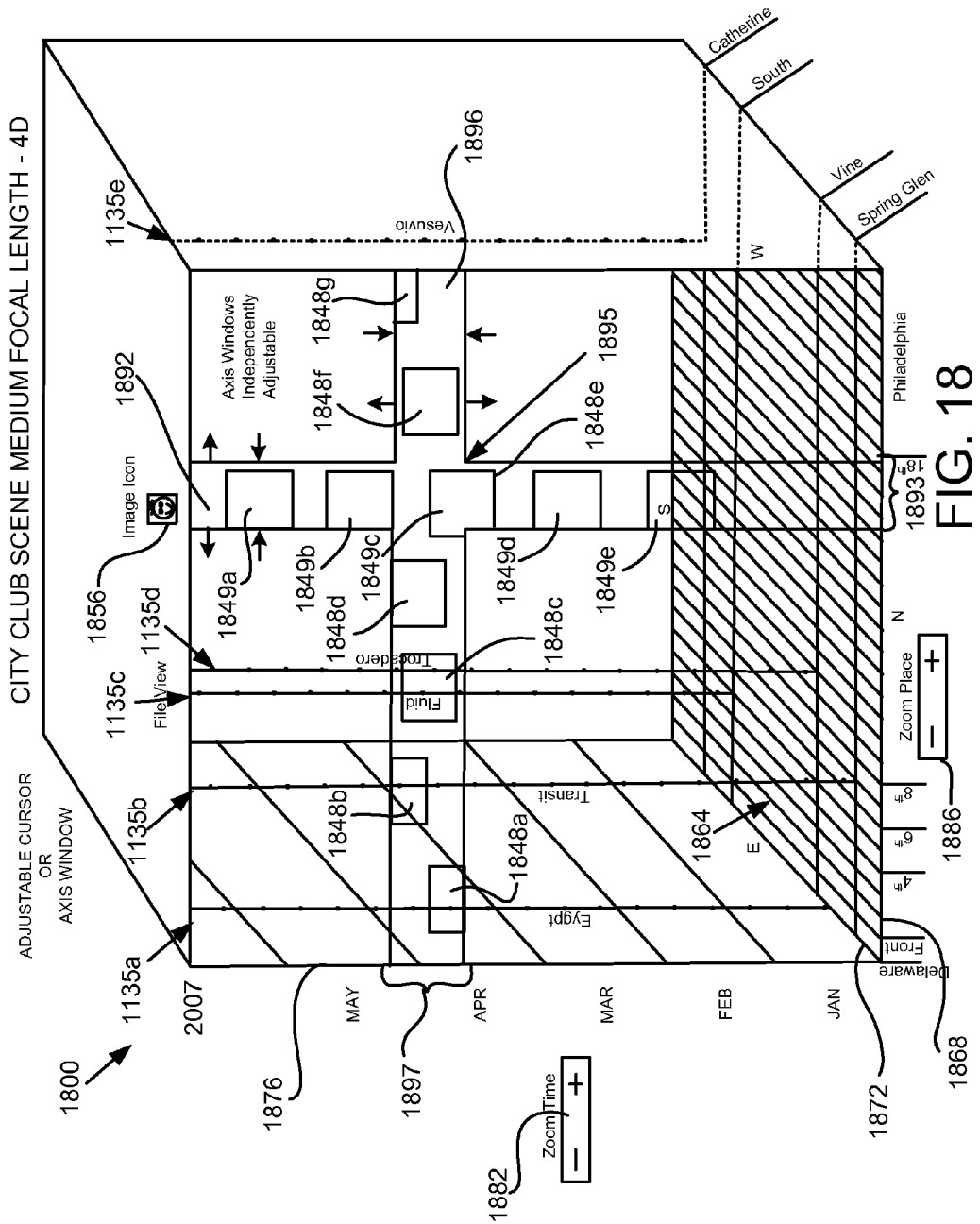
FIG. 18 is a diagram illustrating the navigation of an adjustable cursor through an interface configured to display a concomitant-tracking view, where the adjustable cursor magnifies a location series of image events captured near a particular location and a temporal series of image events captured at a particular location.

FIG. 18 is a diagram illustrating the navigation of an adjustable cursor through an interface 1800 configured to display a concomitant-tracking view, where the adjustable cursor magnifies a location series of image events captured near a particular location and a temporal series of image events captured at a particular location. The interface 1800 includes an x-axis 1868, a y-axis 1872, and a z-axis 1876 on which the plot module 160 plots a location map 1864, together with multiple location pipelines 1135a-1135e.

The z-axis 1876 defines a segment of a timeline divided by the first five or six months in 2007. Larger or smaller segments of the timeline are accessible by the zoom time button 1882. Larger or smaller areas of the location map 1864 are accessible by the zoom place button 1886.

Additionally, the interface 1800 depicts an adjustable cursor/axis window 1895, with a location cursor 1892 and a time cursor 1896. The location cursor 1892 is oriented transversely relative to the x-axis 1868 and the y-axis 1872 to pinpoint a location for the adjustable cursor/axis window 1895. The time cursor 1896 is oriented transversely relative to the z-axis 1876 to pinpoint a moment in time. A user employs the lens module 294 to magnify any events 1848a-1848g, 1848e occupying a position in the same region as the center of the crosshair of the adjustable cursor/axis window 1895.

The lens module 294 magnifies the events 1848a-1848g, 1849a-1848e occupying a position in the same region as the center of the crosshairs of the adjustable cursor/axis window 1895 by displaying the events 1848a-1848g, 1849a-1848e within the user adjusted and defined width 1893 of the location cursor 1892 of the adjustable cursor/axis window 1895 and the user adjusted height 1897 of the time cursor 1896 of the adjustable cursor/axis window 1895. The adjustability and displayed events 1848a-1848g, 1849a-1848e of the adjustable cursor/axis window 1895 give it its name.

Within the height 1897 of the time cursor 1896, the adjustable cursor/axis window 1895 displays a perspective view of a location series of events 1848a-1848g that may be selected in terms of their position relative to the location cursor 1892. In certain embodiments, events 1848 from the location series of events 1848a-1848g that are closer to the location cursor with respect to the y-axis 1872 appear larger than events 1848 that are further away. The user employs the lens module 294 to zoom in and to zoom out to determine the degree of magnification of events 1848 in the 1897 height range of the time cursor 1896 both with respect to the x-axis 1868 and with respect to the y-axis 1872 of the adjustable cursor/axis window 1895, irrespective to the selections made for the overall Cartesian coordinate system displayed by the interface 1800 in terms of the portions of the x-axis 1868, the y-axis 1872, and the z-axis 1876 selected through the zoom time button 1882 and by the zoom place button 1886.

Similarly, in certain embodiments, within the width 1893 of the location cursor 1892, the adjustable cursor/axis window 1895 displays a temporal series of events selected 1849a-1849g in terms of their position relative to the time cursor 1896 along the z-axis 1876. Since the central event 1848e/1849c appears in both the location cursor 1892 and the time cursor 1896, the central event 1848e/1849c is denoted both in terms of the location cursor 1892 and the time cursor 1896. The user employs the lens module 294 to zoom in and to zoom out to determine the degree of magnification of events 1849 in the width 1893 of the location cursor 1892 of the adjustable cursor/axis window 1895, irrespective to the selections made for the overall Cartesian coordinate system displayed by the interface 1800 in terms of the portions of the x-axis 1868, the y-axis 1872, and the z-axis 1876 selected through the zoom time button 1882 and by the zoom place button 1886.

Certain embodiments allow the user to scroll through events 1848 in the height 1897 of the time cursor 1896 in either direction along either the x-axis 1868 or the y-axis 1872, moving away from the location cursor 1892 until the scrolling action finally circles back to the position of the location cursor 1892. Certain embodiments also allow the user to scroll chronologically or reverse-chronologically, in either direction along the z-axis 1876, moving away from the time cursor 1896 until the scrolling action finally circles back to the position of the time cursor 1896.

Some embodiments allow the user to select, through the lens module 294, a certain type of event 1848, 1849 or types of events 1848, 1849 for display or a certain type of event 1848, 1849 or types of events 1848, 1849 to be filtered out from the display. For example, in FIG. 18, the user has selected events 1848, 1849 that constitute image captures and only events that constitute image captures, as indicated by the image icon 1856.

In one embodiment, the invention may be characterized as a four dimensional information technology clock with a graphical interface (4D IT CGI) that synchronizes any of a variety of diverse data sets. This is a powerful characterization since a multitude of data sets could be intuitively synchronized in accordance with embodiments of the invention. By synchronizing multiple data sets, a universal data storage and record keeping application may be established in which everything that is recorded may be recorded by time and place. A myriad of event paths can be created to extend in parallel into the past and may include and be based, at least in part, on events scheduled in the future.

As a backdrop for the advantages of this application, it is noted in history that from the 1850's to the late 1880's the industrialized world arrived at a consensus that there needed to be standardization of units of measurement if commerce were to advance unhindered. At that time there was no standard for weights, measures or time. The lack of temporal standardization in particular was a serious problem because the United States alone had over 70 different time zones and it was impossible, for example, for railroads to provide their passengers with an accurate schedule of arrival and departure times. Meteorologists and astronomers could not coordinate their field sightings because there was no common time base. Workers at factories arrived at all different times. Navigators had trouble plotting routes at the boundaries of colonial dominions. Almost every industry was in need of conventions because most of their commercial activities were conducted with a variety of different temporal languages and using a variety of different standards of weights and measures.

It is apparent that nowadays we have arrived at an analogous condition in the world of Information Technology (IT). The multitude of software platforms in different languages make it difficult to aggregate data at scales larger than the individual platform. The result is much loss due to the necessity of reentering data. For example, in the construction industry, redundant data entry due to lack of interoperability costs the industry up to thirty-six billion dollars annually in the U.S.A. alone.

One solution in accordance with an embodiment of the present invention is to provide a common platform that is compatible with most or all applications, and that accepts most if not all data. This common platform may include an intuitive graphic interface that visually simplifies integration of electronic data by taking the elements that software generally has in common (time, place, objects, actions) and storing values for these elements as variables in a coordinate system. These variables correspond to spatial and/or temporal elements and have an object and/or action associated with them. These variables are thus placeholders for time and/or place values that can then be visually displayed associated events on a grid such as a two or three-dimensional Cartesian coordinate system, for example. It is to be understood that two, three, four, or more dimensions may be displayed on a two or three-dimensional user interface.

Existing data sets can also be included in the universal application. These data sets typically have plot points in existing databases. Hence, a user interface may be provided in the form of a translation layer. The user interface and associated modules are configured to synchronize diverse datasets by distributing the plot-points into standardized spatio-temporal placeholders, which can be plotted on a coordinate system that is universally or nearly universally known and intuitive. In one embodiment, this creates a four dimensional (4D) workspace that enables easy manipulation of large scales of data across multiple platforms such as, for instance, simultaneously displaying regional weather patterns and consumer home electricity usage over time. This enables utilities to compare homes that have upgraded to higher efficiency home energy packages with non-upgraded homes to calculate projected cost savings if upgrades are promoted and adopted.

In one embodiment of the invention, software or some other logic system provides service by collecting and aggregating any or all data by a particular person or about the person and saving the data in a single field. The software can organize all the data by time and date. The data may be organized from oldest to newest so that the single field is simply a temporal plot-point for each event or record on the line. These records may include respective documents that are handled by the software or logic system. For example, documents may include photographs, text, voice recordings, etc.

To establish a spatio-temporal basis for the data that is stored, one embodiment of the present invention relies upon the geography of the earth and the earth's relationship to the sun. A universal application for recording an unlimited number of events is possible because there is a unique location for each point on the surface of the earth, and because time is always passing. Traditionally, time has been based on the revolutions of the earth about its own axis and the earth's orbits around the sun. Thus, as a point of reference a user interface may display a diagram of the sun and the earth in its rotational relationship to the sun, as shown in FIG. 19A.

FIG. 19A is a diagrammatic view 1900, (which may be a screen shot on a user interface), of the sun 1903 and earth 1905 with a meridial plane 1910 passing through the center of the sun 1903 on an axis 1911 perpendicular to the plane of orbit of the earth 1905 about the sun 1903. The meridial plane 1910 also passes through a point on the earth 1905 that is most proximate to the sun 1903. Greenwich Mean Time is generally established to have a time of approximately 12:00 o'clock noon when the meridial plane passes through Greenwich. All other times can generally be determined by dividing the earth 1905 into twenty four equal time zones that each pass through the meridial plane once during the course of a day (one revolution of the earth 1905 about its own axis 1912.) With this basic understanding, the view 1900 of FIG. 19A provides a starting place for an intuitive graphical display of a universal records application in accordance with embodiments of the present invention.

FIG. 19B is a diagrammatic view 1913 (that can also be a screen shot of a user interface.) The view 1913 adds a time dimension such that the earth 1905 moves constantly upward in a direction of arrow 1915 as the earth 1905 orbits around the sun 1903, thus forming an upward spiral 1920. This view 1913 may be beneficial when a user wants to search events by times or dates, or wishes to coordinate terrestrial events with celestial movements.

Figure 19C:
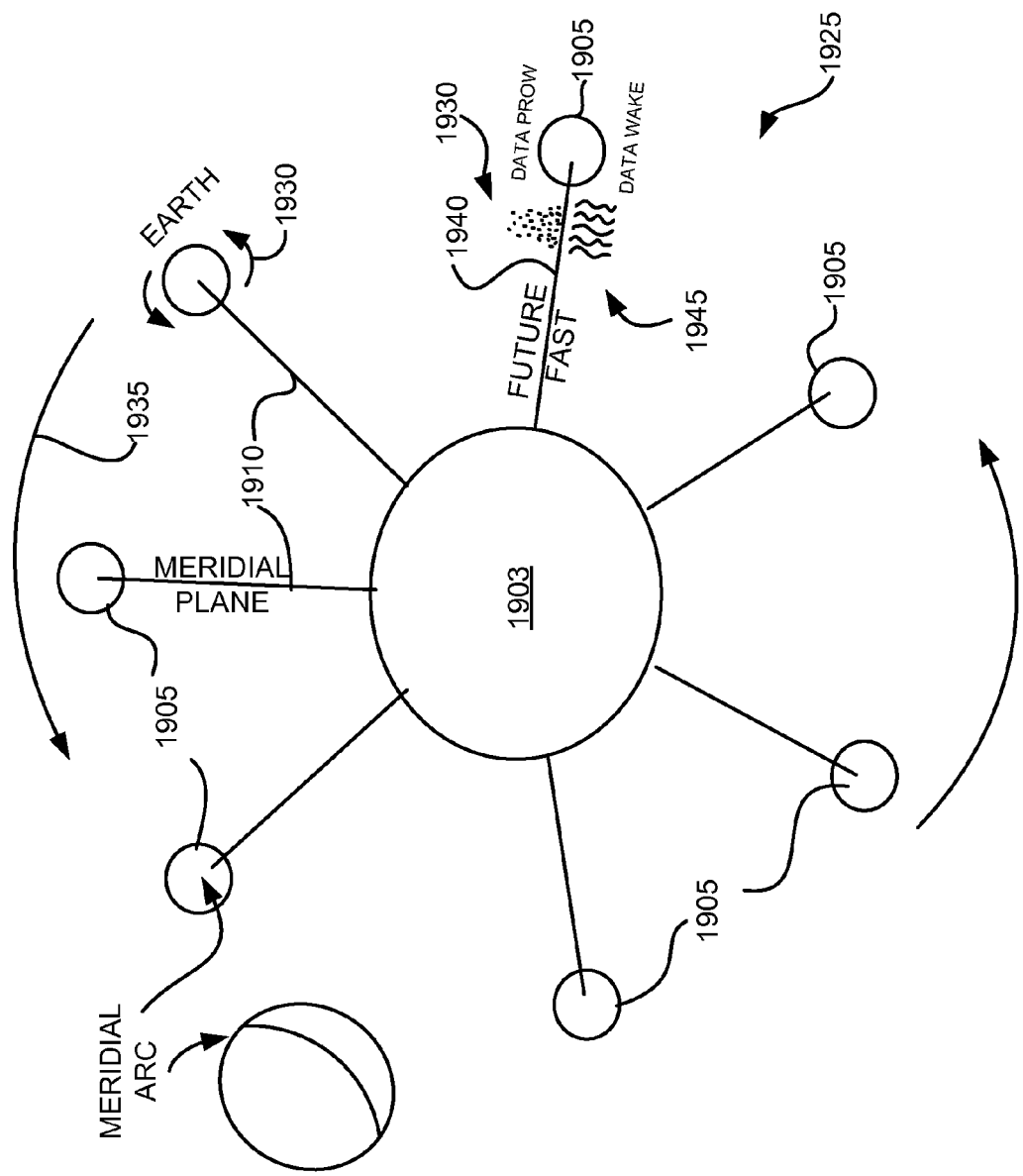
FIG. 19C is a diagrammatic top plan view of the sun and earth of FIGS. 19A and 19B showing edge views of the meridial planes.

FIG. 19C is a diagrammatic top plan view 1925, (which may be a screen shot for the user interface), taken in a direction of 19C in each of FIGS. 19A and 19B. This view 1925 illustrates different positions of the earth 1905 relative to the sun 1903 during different times of the year, for example. Thus, a user may benefit from this view 1925 when searching for a record or event that occurred during a particular period of the year.

The views 1900, 1913, and 1925 and their associated screen shots may be provided by software or other logic to enable a user to access data starting from a virtual position remote from the events and outside the places he or she is targeting in a search. The user can then zoom in on a particular time and/or place to reach a virtual position in or proximate to the targeted events and their corresponding records. Thus, FIGS. 19A, 19B, and 19C represent virtual wide-angle views in which the earth 1905 and the sun 1903 may fill the screen. In these views 1900, 1913, and 1925, the earth may be shown rotating counter-clockwise, as indicated by arrow 1930 in FIG. 19C, around its own axis 1912, as it also rotates counter-clockwise around the sun, as indicated by arrow 1935 in FIG. 19C.

The meridial planes 1910 are diagrammatically shown in FIGS. 19A and 19C, and may be depicted in the screen shots of the user interface as moving paddles that rotates around the axis 1911 of the sun 1903. The screen shot may depict a single paddle 1940 representing a single selected time, such as the present, as indicated in FIG. 19C for example. Thus, the paddle 1940 may be linked to the earth 1905 at the closest point on the earth 1905 to the sun 1903, which corresponds to approximately noon at that point.

FIGS. 19B and 19C show a plurality of line threads 1945 extending from a backside of the paddle 1940. As shown in FIG. 19C, these threads 1945 are shown on a paddle 1940, as it traverses the right side of the screen. These threads 1945 correspond to event paths 780a, 780b, 880a-x, 848a-x, 980a, 980b, 1135a-e, etc. These threads 1945 may be caused to dissipate as they recede from a wake of the meridial plane 1910 or paddle 1940. Since the treads 1945 are event paths, they will extend as far back in time as data has been supplied by users.

On the front side of the paddle 1940, dots 1950 in the form of a pixilated starscape may extend in the counter-clockwise direction. These dots 1950 represent planned events or records of future activities or events. Thus, the dots 1950 become more numerous and more closely spaced in a direction toward the paddle 1940 and the meridial plane 1910.

In the view 1900 of FIG. 19A, one side of the earth 1905 is hidden. Nevertheless, the threads 1945 may be shown streaming from the earth 1905 and trailing as the earth follows its orbital path. In one embodiment, the threads may extend from locations on the earth 1905 where the recorded events took place. Similarly, planned events can be depicted in FIG. 19A as dots 1950 similar to those in FIGS. 19B and 19C. However, many of the dots 1950 on the right side of view 1900 of FIG. 19A may be hidden behind the earth 1905. Thus, the dots 1950 in FIG. 19A, if shown, will be more clearly visible on the left side in front of the earth 1905 since the earth's orbit path is in a direction out of the screen on the left of the sun 1903 in FIG. 19A. On the other hand, the threads 1945 and dots 1950 are better depicted in the views 1913 and 1925 of FIGS. 19B and 19C.

To reach the view 1925 from the view 1900, a user can use navigation buttons or other controls to slowly turn the image on its side so that the user maintains a sense of his or her virtual position relative to the earth 1905 and sun 1903. Once on the sun's axis 1911, the user has a bird's eye view enabling him or her to see the meridial plane 1910 on edge. From this vantage point, both sides of the meridial plane and paddle 1940 are visible. The receding edge has the threads 1945 and the advancing edge has the dots 1950. Multiple times may be shown such as various times of the year corresponding to different positions of the earth 1905 relative to the sun 1903. Alternatively, a single time may be depicted in which only one earth 1905 and one meridial plane 1910 would be shown. The user may browse or scan by virtually speeding up time in which the earth 1905 will visibly move counterclockwise around the sun 1903. In this mode, the earth may be shown moving 360 degrees around the sun 1903, with the earth 1905 still attached by the paddle 1940. The rotation in this view will be falling on the left side of the screen after its zenith, with the threads above, trailing the meridial plane 1940 and the stars below. On the right side of the screen, the meridial plane 1910 will be rising with the threads 1945 below and the dots 1950 above the paddle 1940, as shown in FIG. 19C. Alternatively, the user may browse or scan backwards in time, in which the earth would move in the clockwise direction and the threads 1945 and dots 1950 would behave as though a movie or video is being played in reverse.

Figure 20A:
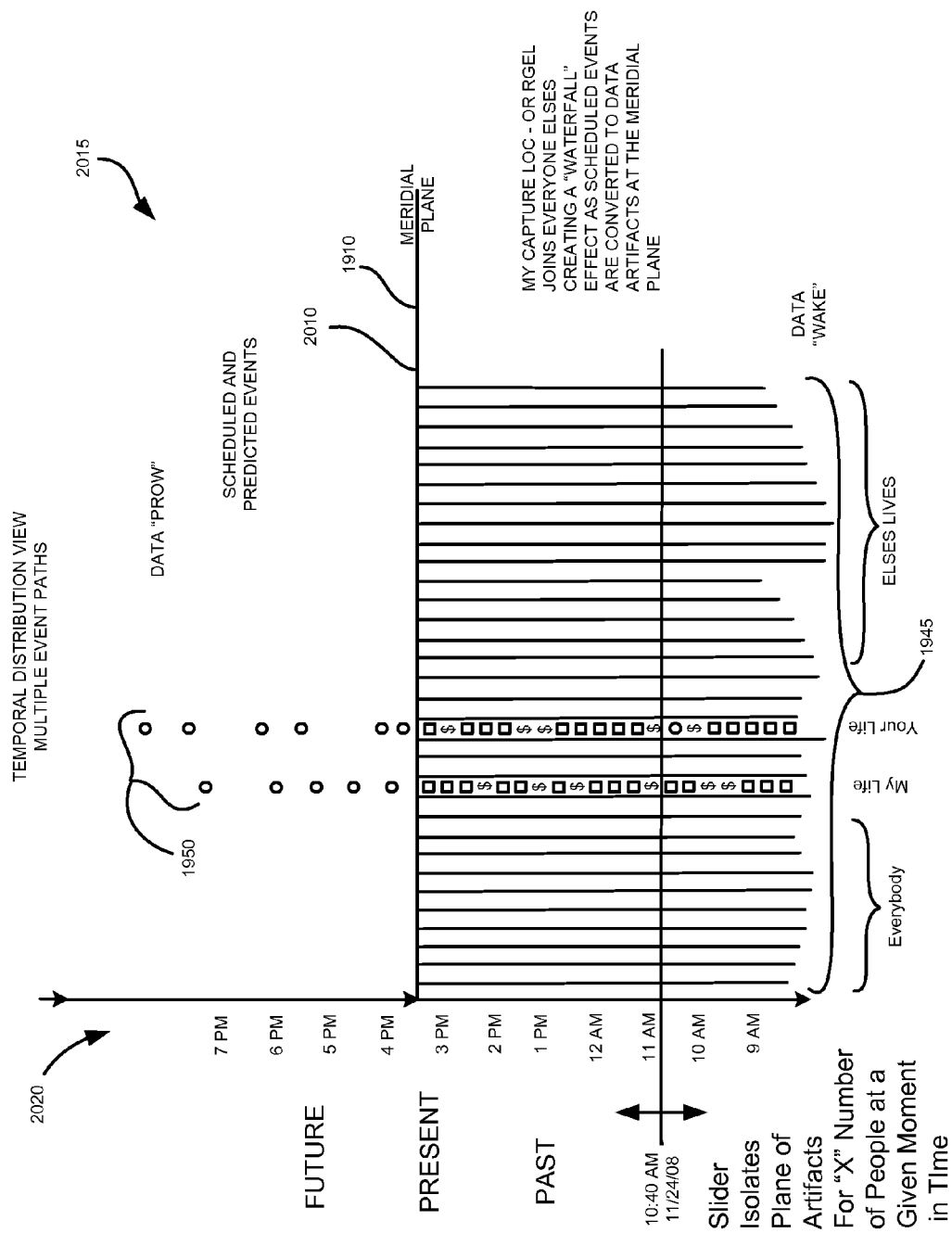
FIG. 20A is a diagrammatic graphical view of at least a portion of a user interface derived from the sun and earth coordinate system of FIGS. 19A-19C.

A user may look at details of a particular time and place by zooming in on the meridial plane 1910 or paddle 1940 until the screen is filled, as shown in FIG. 20A, by a selected portion of a line 2010 corresponding to the plane 1910 or paddle 1940 shown in FIGS. 19A-19C. The corresponding threads 1945 and dots 1950 extend on opposite sides of a line 2010 with the future above with planned events indicated by the dots 1950 above and the recorded events that have passed below the line 2010, as shown in FIG. 20A. In this way, FIG. 20 A is a diagrammatic graphical view 2015 of an edge view of the meridial plane 1910. With the future represented above the line 2010 and the past represented below the line, the motion of earth 1905 relative to the sun 1903 is an implied element that is no longer on the screen. The view 2015 may depict a frozen frame for a particular moment in time, or time may be permitted to continue. In both cases, the line 2010 is positioned at a top to bottom center under control of the software or other logic. In the case in which time continues, the threads 1945 will continue to emit from a bottom side of the line 2010 and the dots 1950 will move down into the line 2010. Some of the planned events that are represented by the dots 1950 will be converted into actual recorded events in the threads 1945. As may be appreciated, the line 2010 may represent an actual present or real time, or the line 2010 may represent a present time that occurred in the past or that will occur in the future, and which has been selected by the user.

The graphical view 2015 of FIG. 20A shows a linear clock 2020 along a left side. The presence of the sun to the left of this view 2015 is implied. Thus, the linear clock 2030 is intuitively placed on the left side of the screen. Were the line 2010 selected at for a meridial plane 1910 at a different position relative to the sun 1903 in FIG. 19C, then the linear clock may be displayed along a side corresponding to the relative position of the sun 1903.

In one embodiment and in a particular selected mode, the meridial plane 1910 and the corresponding line 2010 become a perpetual indicator of the present, and may be posted as of Greenwich Mean Time. Alternatively, the time may be posted as the time corresponding to any selected time zone. In any case, the plane 1910 and line 2010 in this embodiment divides the past from the future.

With reference to FIG. 20A, it is to be understood that the focal length of the linear clock calibration is zoomable. Thus, in any given screen shot a user can select a duration that encompasses an hour, a day, a month, a year, or centuries, for example.

It is to be understood that in any or all of the embodiments, the display on a screen or other user interface may be dynamically changing. Although in some cases a user may select a static view, during regular use the display will be constantly in motion. For example, the dots 1950 may be represented by pixel sized points of light appearing above the meridial plane. These dots 1950 may appear as stars that represent any of a variety of future scheduled events that have been in some way posted electronically. For example, if a thread 1945 represents a person's life, then the dots may represent appointments, music concerts, sports events, conferences, meetings, etc. These planned events may appear on the map in the screen shots as soon as they are posted for a real time dynamically changing picture.

On the other hand, as time move downward, the threads 1945 below the meridial plane 1910 are the digital traces or event paths that are formed by electronically recording events. Thus, an event path representing a person's life may include planned events that become reality as time rolls from future to the past. Thus, the application is a valuable tool for recording and/or reviewing the event paths that people leave behind as they coordinate, implement and document their plans and the resulting events. For a person wearing a GPS unit, the system can record the locations detected by the GPS. Thus, the event path would be a continuous thread that is constantly being reeled out from the meridial plane 1910. As a result, the person or other can follow the motion of that person through time. Event paths may also be established for objects, places, and other things.

Figure 20B:
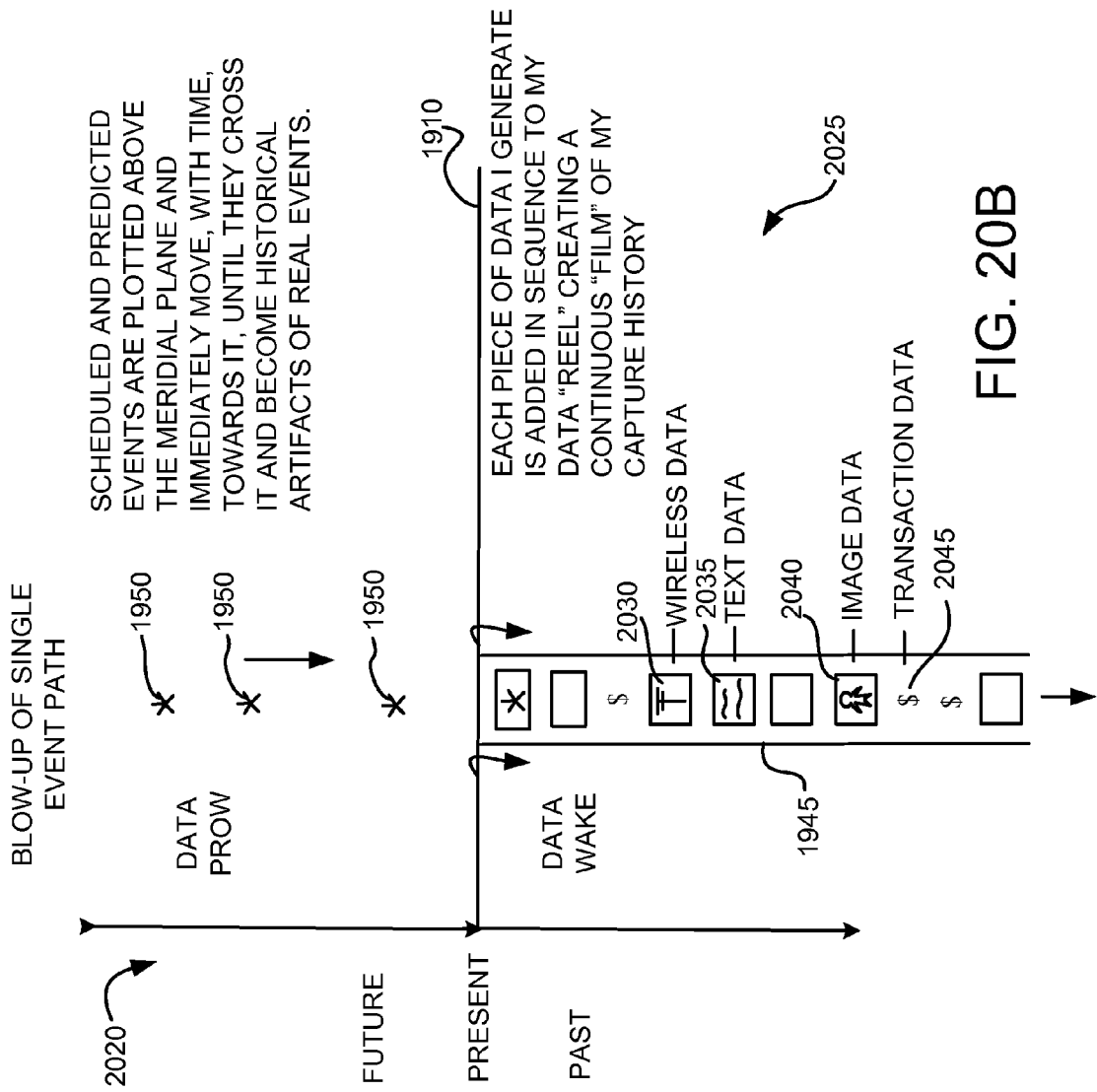
FIG. 20B is a zoomed-in detailed diagrammatic graphical view of at least a portion of the user interface corresponding to a specific portion of the view of FIG. 20A.

FIG. 20B is a graphical view 2025 similar to FIG. 20A, yet zoomed-in to show greater detail. In the area above the meridial plane 1910 are the stars or dots 1950 representing the future or planned events. These dots move toward the meridial plane 1910, as time progresses. Thus, these future events may be termed a data prow. If a planned event is carried into action, then it crosses the meridial plane 1910 and is converted into a historical artifact. Additional data may be captured at the time of the event, and may be added to the data setting forth the planned event to become part of the historical event. In the area below the meridial plane 1910, threads 1945 are emitted from the meridial plane 1910 and move downward, as time progresses. These data threads 1945 are made up of individual events that are recorded and captured. Examples of events include a wireless data event 2030, a text data event 2035, an image data event 2040, and a financial transaction event 2045. Other types of data events may also be captured. The events may be represented by respective icons to identify the event type. The linear clock (shown in FIG. 20A) may also be present in the zoomed in views and help the user narrow in on a particular event he or she wishes to review.

Figure 20C:
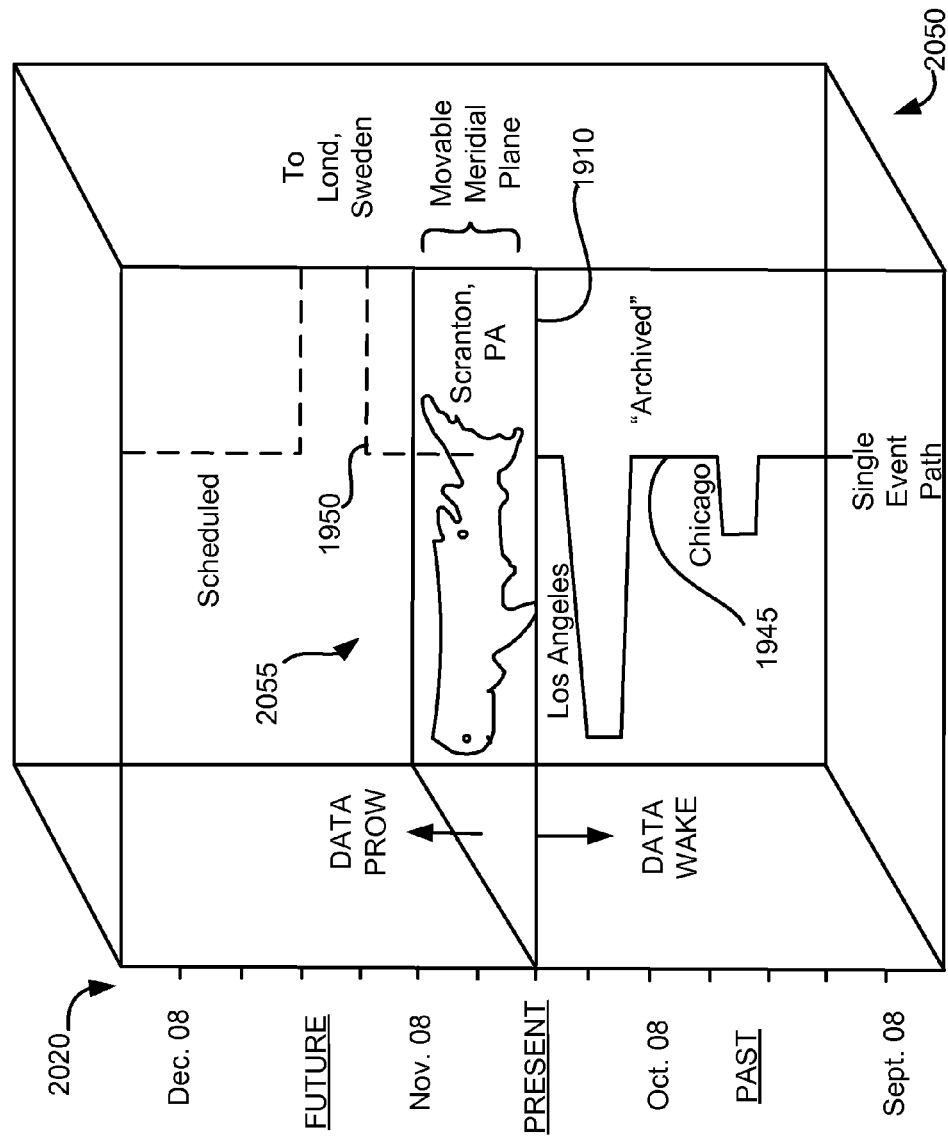
FIG. 20C is a diagrammatic perspective view of a temporal plus spatial coordinate system to which a user can navigate from the graphical views of FIGS. 20A and 20B.

Just as the user can navigate to the graphical top edge views 2015 and 2025 from the side view 1900 of FIG. 19A, the user can also navigate from the top edge views 2015, 2025 back to the side view 1900 or to a perspective view 2050, as shown in FIG. 20C, somewhere between the top views 2015, 2025 and side view 1900. That is, meridial plane 1910 that demarcates past from future in FIGS. 20A and 20B is also a to edge view 2015, 2025 of the meridial plane 1910. Thus, by tilting the edge to a greater or lesser degree moves the screen shot to the a perspective view of a map 2055 corresponding to a portion of the meridial plane 1910 selected. The map 2055 may be represented on a plane in a three-dimensional image of the user interface. As such, at least two dimensions are represented on the meridial plane 1910. The linear clock 2020 may be present in the three-dimensional view 2050. With the map 2055 on a plane of the three dimensional view 2050, the earth (or a portion thereof), the threads 1945, and the dots 1950 are shown in spatial relationships rather than in a single plane. The planned events and events in the past are also shown temporally, or in their time-wise relationships. The events past and present may be represented by icons in the screen shots of the perspective view similar to the representations of the views 2015 and 2025 of FIGS. 20A and 20B.

Navigation to and from the view 2050 of FIG. 20C may be accomplished under control of software or other logic system (s). Thus, there are a variety of navigation graphical plotting modules to support the various views and movement between the views by a user. Further navigation is also available with the various views. For example, the user may browse or scan areas or spaces in the views in greater detail by moving the cursor to any place on the map or in the views. The result is like a magnification lens or zoom lens such that additional data plot points showing greater detail will appear in a window on the screen when they are present. If the user has permissions, he or she will be able to select the data plot points by clicking an associated icon, for example, to view the data. Certain data will be publicly available. Other data will be private. These data plot points may be provided as layers that the user can select depending on his or her permissions.

One of the navigation tools is a slider, which may be a physical control or an active element on the screen. The slider enables the user to go deep into the past in searching for documents, or to go into the future in order to schedule events. Individual or multiple event paths or threads 1945 can be searched simultaneously. In one embodiment, the slider may be a gantry-like layer regularly overlying the meridial plane 1910, and which can be slid up and down on the threads 1945 like a platform on rails. In practice, such a slider enables a user to look into the past by moving along the threads 1945 or "films" of the lives of people. The user can also do the same to look at the history of objects, places, and projects. Applications in accordance with embodiments of the invention illustrate "where" and "when" of the data in visual and/or other ways, limited only to the extent and reach of data capture into the past.

It is to be understood that electronic media for presenting the data is logically arranged along a spatio-temporal thread 1945 of a person who produced and recorded the events. As with other embodiments described herein multiple event paths may be displayed simultaneously. Also event paths may be created for objects, buildings, places, other people, or even projects. The interrelationship between event paths and the dependency of events in one path on events in another path is illustrated in the perspective view 2050 of FIG. 20C and the other views including the views of FIGS. 7, 9, and 13, for example. The data is synchronized so that the data for events occurring at the same time is in the same meridial plane 1910 or map 2055.

By providing a single platform and application for all types of data, in accordance with one embodiment of the present invention, eliminates needless duplication of data for different platforms and different applications. Wasteful re-entry of data for different formats, applications, and platforms can be avoided. The organization of the data according to time and place is intuitive and unifying since all events have a time and a place associated with them. Alternatively expressed, through the embodiments of the present invention, data plot points are also data collection points. This organization of the data gives the data a way in which to self locate. For example, by use of global positioning systems (GPS) or other position detection systems, the location of an event can be automatically uploaded with the other data that is captured for an event.

One of the benefits of embodiments of the present invention is that the event paths that may correspond to the threads 1945 provide legal documentation of events, participants, times, places, etc. The value is in the recorded or captured data and also in the posting data created when a user uploads data. It is to be noted that the validity and accuracy of any document that is uploaded is the responsibility of the person posting the document.

The applications that implement the systems and methods of the present invention will have toolbars with many tools. For example, user interfaces may include specific forms of play, pause, rewind, fast forward, record, edit, file, format, insert, etc. The applications in accordance with embodiments of the present invention may have these tools applied specifically to the various views and applications thereof. Additional tools may include infill, odometer, track log, navigate, speed, transit and survey, for example.

The software and/or other logic systems in accordance with embodiments of the present invention are configured to create a graphical interface, as has been described and shown in the various drawing figures. Referring to FIGS. 20A and 20B, for example, the graphical views 2015, 2025 or interfaces are formatted to represent the series of temporal plot-points 2030, 2035, 2040, 2045 along a line such that they resemble frames on a movie film as they move off a projector reel. Like a film projector, the graphical interfaces 2015, 2025 may project one frame at a time and may do so in sequence. Furthermore, the rate of movement from one event or plot point to another may be adjusted.

In one embodiment, a user's computer is analogous to the projector, in which the "frames" represent events or records on the user's "film". These records or plot-points 2030, 2035, 2040, 2045 may be depicted in chronological order running up and down vertically on a user interface, which may take the form of a screen. Thus, the plot-points may move similar to a film between reels of a film projector. Unlike a film projector and film, the computer and thread 1945 of records or events allows a user to zoom in on details or out away from the details on the event path or thread 1945 of records. When the user zooms out relative to a view 2025, like that of FIG. 20B, the thread 1945 of records no longer fills the screen. Rather, the thread 1945 of records or events becomes a narrow vertical ribbon or strip, like that of FIG. 20A. By zooming further out, the thread 1945 of records or the event path becomes even smaller and may appear as a slender thread.

As may be appreciated, this format of presenting data frees up space to display hundreds, thousands, hundreds of thousands, millions, billions, trillions, or even more of such threads 1945 or films representing persons, places and/or things, and the events that occur in a presence of those persons, places and/or things in. The plurality of threads 1945 of records or events may be presented in the side-by side format, for example, on a user interface that may include an electronic screen as depicted in the screen shot of FIG. 20A. FIGS. 3, 6, 7, 11, and 16-18 also show this side-by-side format.

The various views and movement between views including zooming may be accomplished under software or other logic system control. With software, for example, a routine may be run that temporally synchronizes the events of the various event paths. Thus, the data posted by anyone anywhere at a given moment is synchronized to form a virtual horizontal plane. The data can then be plotted and displayed on a flat geographic map like those shown in FIGS. 8, 11-12, 13, 16-18, and 20C, for example. Alternatively, the map or virtual surface may be curved to match a curvature of the earth or a topography of a particular geographic area selected. Further alternatively, columns or rows can be used to designate a particular location as shown in the views of FIGS. 3-5 and 7. As depicted in the views of several of the embodiments, the synchronized data plot points or events are calibrated to a vertical clock/calendar on one side or another of the screen of a user interface. Alternatively, the clock may extend along a horizontal side of the screen.

In order to standardize the data collection and storage, the screen may be divided at a plane or line representing the present time in terms of Greenwich Mean Time (GMT) or a conversion of the GMT into a local time. In some embodiments, the plane or line dividing the future from the past is a meridial plane 1910 or an associated paddle 1940, like those shown in the embodiments of FIGS. 19A-20C. In some embodiments, the meridial plane 1910 or paddle 1940 divides the screen into upper and lower halves. In other embodiments, the screen need not be divided evenly. In some embodiments, event paths or threads 1945 are placed to one side of a geographical area being considered, as shown in FIG. 19C. In other embodiments, the threads 1945 may be aligned with a point on a map corresponding to the respective events that are planned or that have occurred. In one embodiment, the threads 1945 and/or dots 1950 may be located generally radially outward from a circle or sphere representing the earth at positions generally corresponding to a geographical location for the events.

It is to be understood that the term event path and the term thread are interchangeable for purposes of this disclosure.

Also, the term event path is a general term that includes event pipeline within its broad meaning since the main difference of event pipelines is that they are generally stationary whereas event paths may be for movable objects or people. It is also to be understood that all of the embodiments shown and described herein may be combined with each other in any way. Features from any of the embodiments may be separated out or may be combined with features from other embodiments without limitation.

While the various embodiments have been shown and described with regard to earth and events on the earth, it is to be understood that the views and data capture are not limited to terrestrial events, places and times. The simultaneity of events in a given time plane or meridial plane can be extended to other celestial bodies. For example, when people explore other planets and record events on those planets or in outer space, that data associated with a time and a place can be recorded in the meridial plane corresponding to the moment in time in which those events occur, (to the extent that the laws of relativity allow.)

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for presenting information, the computing system comprising:
   one or more hardware computer processors;
   one or more storage devices storing software code configured for execution by the one or more hardware computer processors in order to cause the computing system to:
   receive event data from a plurality of sources, wherein the event data include a plurality of data items including one or more of a text data item indicating a text message received or sent by an individual, an image data item comprising a photograph taken by the individual or depicting the individual, and a phone data item indicating a phone call received or sent by the individual, and wherein the event data further include a first time and a first location associated with each data item;
   receive future event data from one or more sources, wherein the future event data include at least a first future event comprising a first future event identifier, a first future event time and a first future event location, and a second future event comprising a second future event identifier, a second future event time and a second future event location, and wherein the first future event and the second future event have one or more common data items;
   generate a user interface including:
      a vertical time scale depicting a chronological time period beginning with a past date at a bottom of the vertical time scale and a future date at a top of the vertical time scale;
      a geographical map including areas associated with at least the first future event location and the second future event location, wherein the geographical map is positioned at a location associated with the current time on the vertical time scale; and
      an event path parallel to the vertical time scale and moving horizontally at respective locations such that at a first location of the vertical time scale indicating the first future event time, the event path is vertically aligned with the first future event location on the geographical map and at a second location of the vertical time scale indicating the second future event time, the event path is vertically aligned with the second future event location on the geographical map;
   in response to passage of time, plot movement of the event path, wherein the event path automatically moves downward and is plotted at the first future event location on the geographical map when the first future event time reaches the current time;
   in response to the event path reaching the first future event location on the geographical map collect additional event data associated with the first future event and store the first future event as a first historical event; and
   display the first historical event below the geographical map.

2. The computing system of claim 1, wherein the user interface includes a three dimensional space wherein the geographical map is represented as a horizontal plane at the current time on the vertical time scale.

3. The computing system of claim 2, wherein the event path extending below the geographical map is depicted as a solid line and the event path extending above the geographical map is depicted as a broken line.

4. The computing system of claim 2, wherein the horizontal plane is selectable by a user of the computing device to move the geographical map up or down with reference to the vertical time scale.

5. The computing system of claim 1, wherein the horizontal plane is selectable by a user of the computing device to move the geographical map up or down with reference to the vertical time scale.

6. A non-transitory computer readable medium storing software instructions configured to cause a computing system to:
   receive event data from a plurality of sources, wherein the event data include a plurality of data items including one or more of a text data item indicating a text message received or sent by an individual, an image data item comprising a photograph taken by the individual or depicting the individual, and a phone data item indicating a phone call received or sent by the individual, and wherein the event data further include a first time and a first location associated with each data item;
   receive future event data from one or more sources, wherein the future event data include at least a first future event comprising a first future event identifier, a first future event time and a first future event location, and a second future event comprising a second future event identifier, a second future event time and a second future event location, and wherein the first future event and the second future event have one or more common data items;
   generate a user interface including:
      a vertical time scale depicting a chronological time period beginning with a past date at a bottom of the vertical time scale and a future date at a top of the vertical time scale;
      a geographical map including areas associated with at least the first future event location and the second future event location, wherein the geographical map is positioned at a location associated with the current time on the vertical time scale; and
      an event path parallel to the vertical time scale and moving horizontally at respective locations such that at a first location of the vertical time scale indicating the first future event time, the event path is vertically aligned with the first future event location on the geographical map and at a second location of the vertical time scale indicating the second future event time, the event path is vertically aligned with the second future event location on the geographical map;

in response to passage of time, plot movement of the event path, wherein the event path automatically moves downward and is plotted at the first future event location on the geographical map when the first future event time reaches the current time;

in response to the event path reaching the first future event location on the geographical map, collect additional event data associated with the first future event and store the first future event as a first historical event; and display the first historical event below the geographical map.

7. A method comprising:

receiving, by a computing system having one or more hardware processors and a non-transitory storage device, event data from a plurality of sources, event data from a plurality of sources, wherein the event data include a plurality of data items including one or more of a text data item indicating a text message received or sent by an individual, an image data item comprising a photograph taken by the individual or depicting the individual, and a phone data item indicating a phone call received or sent by the individual, and wherein the event data further include a first time and a first location associated with each data item;

receiving, by the computing system, future event data from one or more sources, wherein the future event data include at least a first future event comprising a first future event identifier, a first future event time and a first future event location, and a second future event comprising a second future event identifier, a second future event time and a second future event location, and wherein the first future event and the second future event have one or more common data items;

generating, by the computing system, a user interface including:

a vertical time scale depicting a chronological time period beginning with a past date at a bottom of the vertical time scale and a future date at a top of the vertical time scale;

a geographical map including areas associated with at least the first future event location and the second future event location, wherein the geographical map is positioned at a location associated with the current time on the vertical time scale; and an event path parallel to the vertical time scale and moving horizontally at respective locations such that at a first location of the vertical time scale indicating the first future event time, the event path is vertically aligned with the first future event location on the geographical map and at a second location of the vertical time scale indicating the second future event time, the event path is vertically aligned with second future event location on the geographical map;

in response to passage of time, plotting movement of the event path, wherein the event path automatically moves downward and is plotted at the first future event location on the geographical map when the first future event time reaches the current time;

in response to the event path reaching the first future event location on the geographical map, collecting additional event data associated with the first future event and storing the first future event as a first historical event; and displaying the first historical event below the geographical map.

* * * * *

UNITED STATES PATENT AND TRADEMARK OFFICE
CERTIFICATE OF CORRECTION

| | |
|---|---|
| PATENT NO. | : 8,994,731 B2 |
| APPLICATION NO. | : 12/340453 |
| DATED | : March 31, 2015 |
| INVENTOR(S) | : David C. Nevins |

It is certified that error appears in the above-identified patent and that said Letters Patent is hereby corrected as shown below:

In the specification

In column 24 at line 3, Change "line" to --fine--.

In the claims

In column 30 at line 13, In Claim 1, change "map" to --map,--.

In column 31 at lines 21-22, In Claim 7, change "event data from a plurality of sources, event data from a plurality of sources," to --event data from a plurality of sources,--.

In column 32 at line 22, In Claim 7, change "with" to --with the--.

Signed and Sealed this
First Day of December, 2015

Michelle K. Lee
*Director of the United States Patent and Trademark Office*